(12) United States Patent
Takeuchi et al.

(10) Patent No.: US 12,394,564 B2
(45) Date of Patent: Aug. 19, 2025

(54) METHOD OF MANUFACTURING POLAR ANISOTROPIC MAGNET, METHOD OF MANUFACTURING MAGNET ASSEMBLY, POLAR ANISOTROPIC MAGNET, MAGNET ASSEMBLY, AND COMPOSITE MAGNET ASSEMBLY

(71) Applicant: MIYAWAKI KOBO CO., LTD., Nagano (JP)

(72) Inventors: Kesatoshi Takeuchi, Nagano (JP); Tadashi Sasaki, Nagano (JP); Hideaki Takayanagi, Nagano (JP); Takahiro Mibu, Nagano (JP)

(73) Assignee: MIYAWAKI KOBO CO., LTD., Nagano (JP)

( * ) Notice: Subject to any disclaimer, the term of this patent is extended or adjusted under 35 U.S.C. 154(b) by 436 days.

(21) Appl. No.: 18/001,592

(22) PCT Filed: Dec. 22, 2021

(86) PCT No.: PCT/JP2021/047696
§ 371 (c)(1),
(2) Date: Dec. 13, 2022

(87) PCT Pub. No.: WO2022/138765
PCT Pub. Date: Jun. 30, 2022

(65) Prior Publication Data
US 2023/0223191 A1    Jul. 13, 2023

(30) Foreign Application Priority Data

Dec. 25, 2020 (JP) ................................. 2020-217973
Dec. 25, 2020 (JP) ................................. 2020-217974

(51) Int. Cl.
*H01F 41/02* (2006.01)
*H01F 7/02* (2006.01)
(Continued)

(52) U.S. Cl.
CPC ........... *H01F 41/028* (2013.01); *H01F 7/021* (2013.01); *H01F 13/003* (2013.01); *H02K 15/03* (2013.01)

(58) Field of Classification Search
CPC ...... H01F 41/028; H01F 7/021; H01F 13/003; H02K 15/03
See application file for complete search history.

(56) References Cited

U.S. PATENT DOCUMENTS 7,618,496 B2 * 11/2009 Sato ...................... H01F 7/0268
148/300
2017/0187258 A1 * 6/2017 Fujikawa ............. H02K 1/2791

FOREIGN PATENT DOCUMENTS

JP        2010142082 A     6/2010
WO    WO1991018405 A1 * 11/1991 ............. H01F 41/02

* cited by examiner

*Primary Examiner* — Adil A. Siddiqui
(74) *Attorney, Agent, or Firm* — HAUPTMAN HAM, LLP

(57) ABSTRACT

A method of manufacturing a polar anisotropic magnet includes manufacturing polar anisotropic magnets 1N, 1S having four surfaces SF1, SF2, SF3. The method includes: an in-field molding step S20 for performing molding in a magnetic field while applying a magnetic field in a first direction of one effective surface VSF (SF1) among the four surfaces and applying a magnetic field in a second direction to the remaining three surfaces (SF2, SF3, SF4); and a four-way magnetization step S40 for performing magnetization by applying a magnetic field in the first direction to the effective surface VSF (SF1) and by applying a magnetic field in the second direction to the remaining three surfaces (SF2, SF3, SF4). The present invention provides a method of manufacturing a polar anisotropic magnet and a method of (Continued)

manufacturing a magnet assembly that have a higher degree of freedom in designing and are more economical than other approaches.

29 Claims, 21 Drawing Sheets

(51) Int. Cl.
*H01F 13/00* (2006.01)
*H02K 15/03* (2025.01)

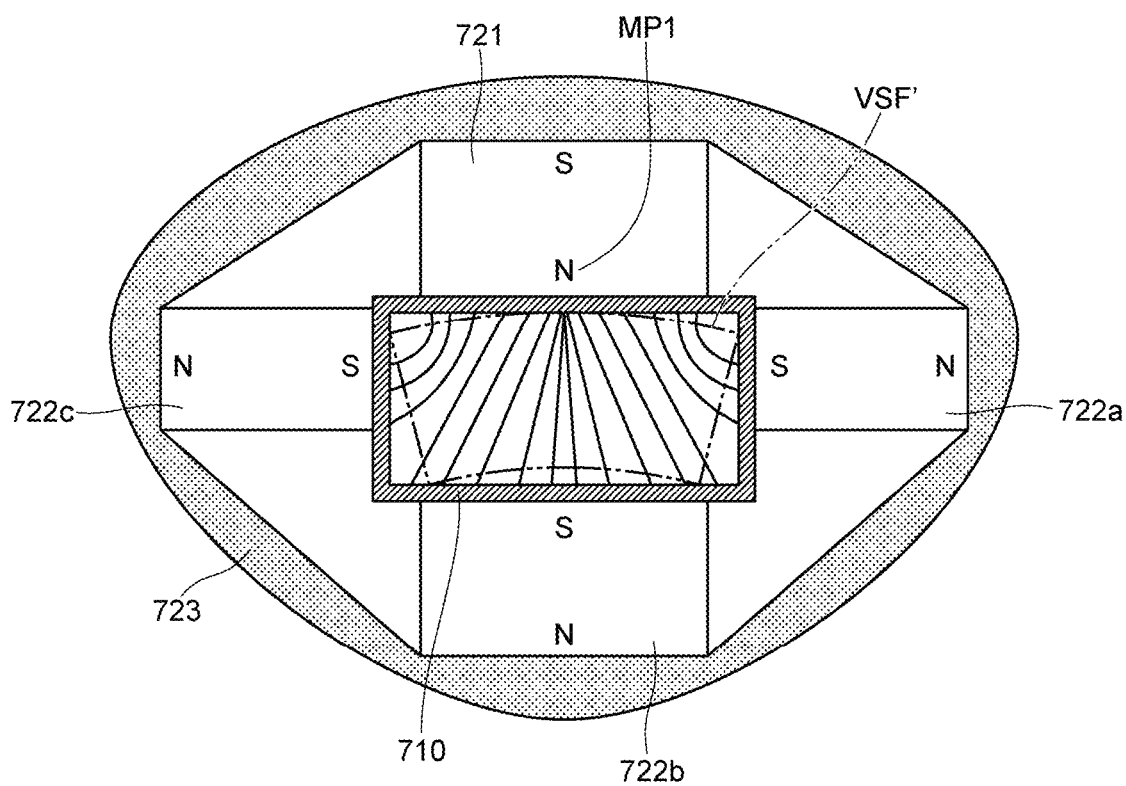
FIG. 6
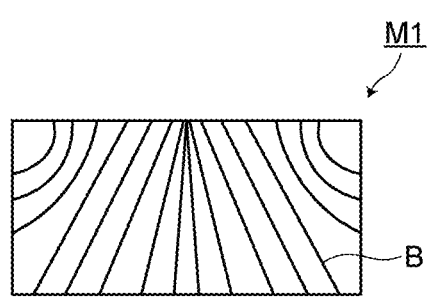
FIG. 7
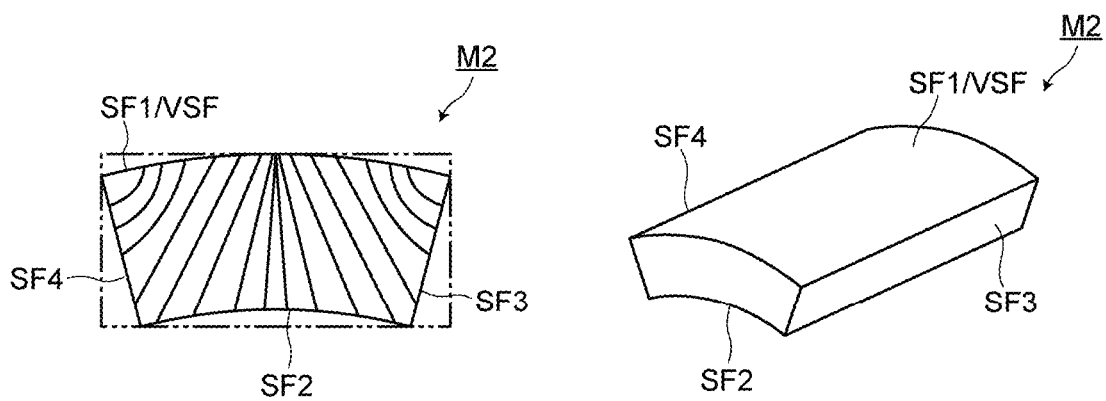
FIG. 8A
FIG. 8B

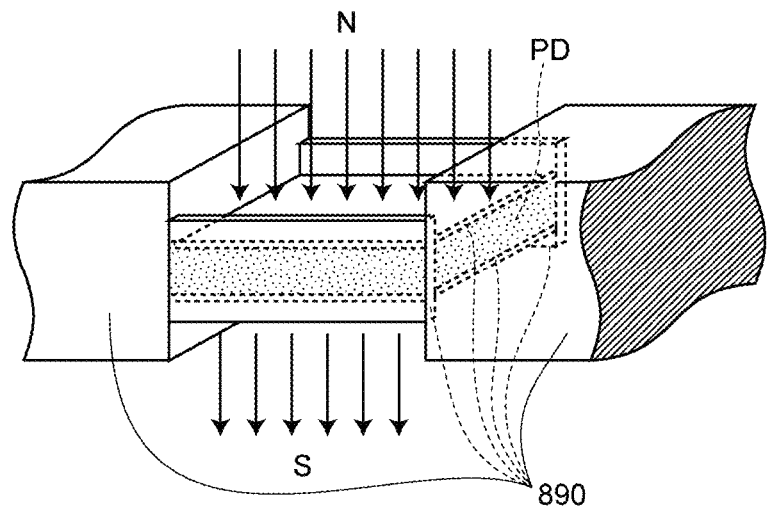
FIG. 18A
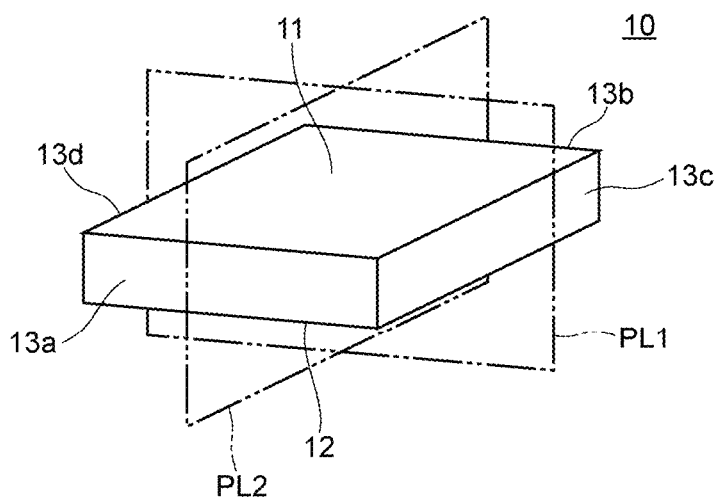
FIG. 18B
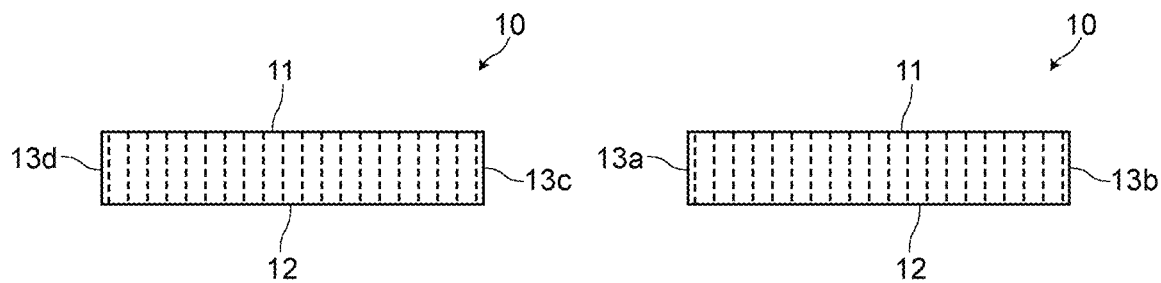
FIG. 18C
FIG. 18D

METHOD OF MANUFACTURING POLAR ANISOTROPIC MAGNET, METHOD OF MANUFACTURING MAGNET ASSEMBLY, POLAR ANISOTROPIC MAGNET, MAGNET ASSEMBLY, AND COMPOSITE MAGNET ASSEMBLY

RELATED APPLICATIONS

The present application is a National Phase of International Application No. PCT/JP2021/047696 filed Dec. 22, 2021, which claims priority to Japanese Application Nos. 2020-217973, filed Dec. 25, 2020, and 2020-217974, filed Dec. 25, 2020.

TECHNICAL FIELD

The present invention relates to a method of manufacturing a polar anisotropic magnet, a method of manufacturing a assembly, a polar magnet anisotropic magnet, a magnet assembly, and a composite magnet assembly.

BACKGROUND ART

It has been known that a magnet assembly formed in a so-called Halbach array can generate a magnetic flux with high magnetic flux density. However, in realizing this Halbach array, strongly magnetized magnets are laminated to each other in a state where a large attraction or a large repulsion is generated and hence, the realization of the Halbach array has many difficulties whereby there is still no prospect for mass production of magnet assemblies that are formed using the Halbach array.

As a substitute technique which can acquire magnetic flux density at the same level as the Halbach array and has a potential of possibility of mass production, there has been known a magnet assembly having the configuration illustrated in FIGS. 3A and 3B of Patent Literature 1 (hereinafter simply referred to as the magnet assembly described in Patent Literature 1).

FIG. 30 is a cross-sectional view illustrating a magnet assembly 900 described in Patent Literature 1. Arrows depicted in the magnet assembly 900 indicate magnetization direction.

As illustrated in FIG. 30, the magnet assembly 900 is formed of: a magnet assembly 900EX on an outer peripheral side having a circular cylindrical shape; and a magnet assembly 900IN on an inner peripheral side having a circular cylindrical shape. The magnet assembly 900EX on an outer peripheral side has a polar anisotropic array where the magnetization direction is inclined with respect to a normal line NL of the magnet assembly 900EX by an angle θHEX. The angle θHEX is an angle that goes beyond 45 degrees and is close to 90 degrees. In other words, the magnet assembly 900EX forms a magnet assembly of "a horizontal-system polar anisotropic array" where an angle made by the magnetization direction and a tangent line (not illustrated in the drawing) of an outer peripheral surface is relatively shallow. On the other hand, the magnet assembly 900IN on an inner peripheral side forms a polar anisotropic array where the magnetization direction is inclined by an angle θHIN with respect to the normal line NL. The angle θHIN is an angle of 0 degrees or more and less than 45 degrees. In other words, the magnet assembly 900IN forms a magnet assembly of "a vertical-system polar anisotropic array" where an angle made by the magnetization direction and a tangent line (not illustrated in the drawing) of an inner peripheral surface is relatively deep.

The magnet assembly obtained by 900 is manufacturing the magnet assembly 900EX (also referred to as a circular cylindrical body 900EX) on an outer peripheral side and the magnet assembly 900IN (also referred to as a circular cylindrical body 900IN) on an inner peripheral side separately, and by integrating these circular cylindrical bodies by fitting engagement.

A method of manufacturing the magnet assembly 900EX on an outer peripheral side and a method of manufacturing the magnet assembly 900IN on an inner peripheral side are substantially equal. Accordingly, here, a case where the circular cylindrical body 900EX on an outer peripheral side is manufactured is described as a representative example. FIG. 31 is a view for describing a conventional method of manufacturing the magnet assembly 900EX. In FIG. 31, (Phase 1) indicates a mold 810 and magnetic sources 820S, 820N used in a in-field molding step, (Phase 2) indicates a magnet base material M1, (Phase 3) indicates a mode of a magnetization step, and (Phase 4) indicates the magnet assembly 900EX picked up after the magnetization step is completed.

A method of manufacturing a conventional magnet assembly is performed as follows in general.

First, a powder material for magnets, the mold 810 and the like are prepared. The mold 810 is formed in a circular cylindrical shape where the inside of the mold 810 conforms to a shape of the final magnet assembly 900EX.

Next, a in-field molding step is performed. The powder material is filled in an inside 810a of the mold 810 and, thereafter, a predetermined magnetic field is applied to the powder material from the outside of the mold 810 using magnetic sources 820S, 820N thus molding the powder material in such a manner where respective molecules of the magnetic powder are oriented along lines of magnetic force (see (Phase 1) in FIG. 31). The magnet base material M1 is obtained by performing such a step (see (Phase 2) in FIG. 31). Then, the magnet base material M1 is subjected to required intermediate steps (a sintering and heat treatment step, a surface treatment step and the like) and, thereafter, a magnetization step is performed so as to apply a predetermined magnetic field using magnetic sources 830S, 830N (magnetization yoke or the like) (see (Phase 3) in FIG. 31). In accordance with such steps, the magnet assembly 900EX can be obtained (see (Phase 4) in FIG. 31).

CITATION LIST

Patent Literature

PTL 1: JP-A-2010-142082

SUMMARY OF INVENTION

Technical Problem

However, as described hereinafter, the conventional method of manufacturing a magnet assembly has a drawback that an economic growth cannot be realized because of a high manufacturing cost and low productivity (for example, a low yield). The conventional method of manufacturing a magnet assembly also has a drawback that many restrictions are imposed on designing.

To name one example, with respect to the mold 810 used in the in-field molding step, it is necessary to prepare a mold having a shape that conforms to a final magnet assembly each time the specification of a product changes. Accordingly, a cost for mold is increased so that a cost for manufacturing a magnet assembly is increased eventually (drawback relating to cost).

Further, in a case where the magnet assembly 900EX on an outer peripheral side is designed such that the magnet assembly 900EX has a relatively small wall thickness in a radial direction, when the sintering and heat treatment step is performed after performing the in-field molding step, there is a case where the magnet assembly 900EX ruptures or a yield of the magnet assemblies 900EX is decreased (drawback relating to rupture).

To prevent such a drawback in advance, with respect to magnet assembly 900EX on an outer peripheral side, there is no other way but to set a thickness size of the magnet assembly 900EX slightly larger than a required necessary thickness size for exhibiting an expected performance (the addition of a design margin being indispensable). In this case, an amount of wall thickness in a radial direction of the magnet assembly 900IN on an inner diameter side is decreased by an amount corresponding to the increase of the wall thickness of the magnet assembly 900EX. As a result, it is impossible to acquire a desired ratio between a thickness of a horizontal-system polar anisotropic array and a thickness of a vertical-system radial anisotropic array and hence, there is a case where a desired magnetic property cannot be obtained eventually.

Further, in changing data on sizes such as a thickness and an outer diameter of the magnet assembly by changing a type of a polar anisotropic magnet, there arises a drawback that a yield is lowered or a required magnetic characteristic cannot be ensured.

As illustrated in FIG. 32A, in a case where it is possible to design a magnet assembly such that the magnet assembly can ensure a sufficient thickness in a radial direction of the magnet assembly (see thickness T1), in the vicinity of a region from which lines of magnetic force are radiated to the outside, the orientation direction of powder after the in-field molding step is performed can be ensured at an appropriate angle with respect to an outer peripheral surface (at an angle relatively close to a normal line NL) and hence, the orientation direction of powder becomes the magnetization direction when a magnetization step is performed. Accordingly, it is possible to acquire a polar anisotropic magnet assembly having a desired magnetic characteristic eventually. However, as described in FIG. 32B, in a case where it is necessary to design a magnet assembly such that the magnet assembly has to have a small thickness in a radial direction of the magnet assembly (see thickness T2), the orientation direction of powder can ensure only a shallow angle with respect to an outer peripheral surface (an angle close to approximately 90° with respect to a normal line NL). As a result, lines of magnetic force cannot be radiated to the outside with desired intensity and hence, there is a case where a polar anisotropic magnet assembly cannot ensure a magnetic characteristic that is required to possess as a product.

That is, when priority is assigned to the reduction of the thickness of magnet assembly, the degree of freedom in designing the orientation direction (magnetization direction) is deprived. On the other hand, priority is assigned to the orientation direction (magnetization direction), the degree of freedom in designing the thickness of the magnet assembly is deprived.

Further, conventionally, the acquisition of the polar anisotropic magnet that forms a portion of the magnet assembly on an outer peripheral side (for example, the polar anisotropic magnet of a portion surrounded by a broken line C in FIG. 30, for example) also has many drawbacks on mass production.

In assembling the magnet assembly in a magnetized condition, a magnet 905 and a magnet 906 that are magnetized in an approximately horizontal direction are joined to each other in a state where the surfaces having the same magnetic pole abut against each other and hence, a large repulsive force is generated between the respective surfaces. Accordingly, the mass production of the magnetic assemblies in such a situation is difficult (polar anisotropic magnets formed of the magnets 907, 908 in the broken line D also having the same drawback).

Incidentally, in case of base materials (assuming the base materials not illustrated in the drawing) before the base materials 905', 906' become the magnet 905 and the magnet 906, no retractive force is generated between the base material 905' and the base material 906' and hence, bonding can be easily performed. However, a magnetization method in a magnetization step performed next is not established. Eventually, it is difficult to manufacture the polar anisotropic magnets indicated by broken lines D, C in FIG. 30 on a mass production basis.

The present invention has been made in view of the above-mentioned circumstances, and it is an object of the present invention to provide a method of manufacturing a polar anisotropic magnet and a method of manufacturing a magnet assembly which have a higher degree of freedom in design and are more economical than the related art. Further, it is an object of the present invention to provide an anisotropic magnet, a magnet assembly, and a composite magnet assembly.

Solution to Problem

According to a first aspect of the present invention, there is provided a method of manufacturing a polar anisotropic magnet having four surfaces that respectively face four directions as viewed in cross section. The method of manufacturing a polar anisotropic magnet includes, in a following order: a powder material preparation step in which a powder material for a magnet is prepared; an in-field molding step in which the powder material is sequentially charged into the mold in a state where, assuming a surface on which a magnetic flux is to be generated in a concentrated manner out of the four surfaces as an effective surface, a magnetic field of a first direction is applied to a scheduled effective surface expected to become the effective surface and a magnetic field of a second direction is applied to the remaining three surfaces from an outside of the mold that corresponds to a target shape of the polar anisotropic magnet thus molding a magnet base material having a shape that traces the mold; and a four-way magnetization step in which a magnet material obtained based on the magnet base material is magnetized by applying the magnetic field of the first direction to the effective surface of the magnet material and by applying the magnetic field of the second direction to the remaining three surfaces in a state where the magnetic field of the first direction and the magnetic field of the second direction surrounds the magnet material obtained based on the magnet base material.

A polar anisotropic magnet according to the present invention is a polar anisotropic magnet having four surfaces that respectively face four directions as viewed in cross section, wherein assuming the surface on which a magnetic flux is to be generated in a concentrated manner as an effective surface among the four surfaces, one magnetic pole is disposed on the effective surface, and the other magnetic pole is disposed on the remaining three surfaces among the four surfaces respectively, and as viewed in cross section, no adhesion trace is formed in the inside of the polar anisotropic magnet so that the polar anisotropic magnet is formed continuously in the inside of the polar anisotropic magnet.

Further, a magnet assembly according to the present invention is formed of a plurality of polar anisotropic magnets described above, wherein the polar anisotropic magnets are arranged such that the one magnetic pole and the other magnetic pole alternately appear and the polar anisotropic magnets are joined to each other.

Further, according to another aspect of the present invention, there is provided a method of manufacturing a magnet assembly having a cylindrical shape. The method of manufacturing a magnet assembly includes, in a following order: a powder material preparation step where a powder material for a magnet is prepared; an in-field molding step where a "magnet base material" having a first main surface and a second main surface disposed on a side opposite to the first main surface is molded, wherein the powder material is charged into the inside of a mold that corresponds to a shape of the magnet base material, and a magnetic field having lines of magnetic force in a single direction and in parallel is applied to an outer side of the mold from a side that corresponds to the first main surface to a side that corresponds to the second main surface, thus molding the magnet base material; a cutting step where, a surface that forms an outer diameter surface of the magnet assembly when assembled as the magnet assembly is defined as a "scheduled outer diameter surface" and a surface that forms an inner diameter surface when assembled as the magnet assembly is defined a "scheduled inner diameter surface", a cutting line of the scheduled outer diameter surface is set to have inclination of an angle θ1 with respect to the first main surface, the magnet base material is cut along the cutting line of the scheduled outer surface, a cutting line of the scheduled inner diameter surface is set to have inclination of an angle θ2 with respect to the first main surface, the magnet base material is cut along the cutting line of the scheduled inner surface, thus cutting out a magnet base material piece having at least the scheduled outer diameter surface and the scheduled inner diameter surface on an outer surface; an assembly step where a plurality of the magnet base material pieces are combined with each other so as to assemble a magnet base material assembly; and a magnetization step where a predetermined magnetic field is applied to the magnet base material assembly from an outside of the magnet base material assembly at a predetermined position, thus magnetizing the magnet base material assembly.

Further, a magnet assembly according to the present invention includes a magnet block having an outer diameter surface and an inner diameter surface each formed of an approximately flat surface, the magnet block magnetized with lines of magnetic forces in a single direction and in parallel at a predetermined angle with respect to the outer diameter surface and the inner diameter surface. A plurality of the magnet blocks are joined to each other by way of a surface other than the outer diameter surface and the inner diameter surface.

Further, a composite magnet assembly according to the present invention includes:
  the magnet assembly of the first mode described above where the angle of the magnetization direction with respect to the outer diameter surface and the inner diameter surface of each magnetic block is set to a first angle; and the magnet assembly of the second mode described above where the angle of the magnetization direction with respect to the outer diameter surface and the inner diameter surface of each magnetic block is set to a second angle that differs from the first angle. The magnet assembly of the first mode is disposed on a side that is to be formed as the effective H magnetic flux surface of the composite magnet assembly, and the magnet assembly of the second mode is disposed on a side that is to be formed as the effective V magnetic flux surface of the composite magnet assembly, and the magnet assembly of the first mode and the magnet assembly of the second mode are joined to each other.

According to still another aspect of the present invention, there is provided a method of manufacturing a polar anisotropic magnet having four surfaces as viewed in cross section.

The method of manufacturing a polar anisotropic magnet includes, in a following order: a powder material preparation step in which a powder material for a magnet is prepared; an in-field molding step in which a "magnet base material" having a first main surface and a second main surface on a side opposite to the first main surface is molded in such a manner that the powder material is charged into the inside of the mold that corresponds to a shape of the magnet base material, and a magnetic field having lines of magnetic force in a single direction and in parallel is applied to an outer side of the mold from a side that corresponds to the first main surface to a side that corresponds to the second main surface, thus molding the magnet base material; a cutting step in which, when the polar anisotropic magnet is assembled as a magnet assembly, a surface of the polar anisotropic magnet that is scheduled to form an outer diameter surface of the magnet assembly is defined as a "scheduled outer diameter surface" and a surface of the polar anisotropic magnet that is scheduled to form an inner diameter surface of the magnet assembly is defined as a "scheduled inner diameter surface", a cutting line of the scheduled outer diameter surface is set so as to have an inclination of an angle θ1 with respect to the first main surface and the magnet base material is cut along the cutting line of the scheduled outer diameter surface, a cutting line of the scheduled inner diameter surface is set so as to have an inclination of an angle θ2 with respect to the first main surface and the magnet base material is cut along the cutting line of the scheduled inner diameter surface, thus cutting out a magnet base material piece having at least the scheduled outer diameter surface and the scheduled inner diameter surface on an outer surface, a sub assembly step in which a magnet base material sub assembly having four surfaces is assembled by combining at least four magnet base material pieces in such a manner that, assuming the surface on which a magnetic flux is to be generated in a concentrated manner among the four surfaces as an effective surface, on a side of the magnet base material sub assembly that forms the effective surface, the magnet base material piece of a horizontal system is disposed in a state where cutting is performed such that the angle θ1 and the angle θ2 in the cutting step are each set to a value that falls within a range from more than 45 degrees to less than 90 degrees, and on a side of the magnet base material subassembly opposite to the side on which the effective surface is formed, the magnet base material piece of a vertical system is disposed in a state where cutting is performed such that the angle θ1 and the angle θ2 in the cutting step are each set to a value that falls within a range from 0 degrees or more to less than 45 degrees, thus assembling the magnet base material sub assembly, and a four-way magnetization step where a magnetic field in a first direction is applied to the effective surface of the magnet base material sub assembly, and a magnetic field in a second direction is applied to the remaining three surfaces in a state where the magnetic field in the first direction and the magnetic field in the second direction surround the magnet base material sub assembly, thus magnetizing the magnet base material sub assembly.

Advantageous Effects of Invention

With such configurations, it is possible to provide a method of manufacturing a polar anisotropic magnet and a method of manufacturing a magnet assembly that have a higher degree of freedom in designing and are more economical than the related art.

BRIEF DESCRIPTION OF DRAWINGS

FIG. 6 is a schematic cross-sectional view illustrating a mode for performing an in-field molding step S20.

FIG. 7 is a schematic view of a magnet base material M1 taken out after the in-field molding step S20 is performed.

FIGS. 8A and 8B are schematic views of a magnet material M2 taken out after a working step S32 is performed.

FIGS. 18A to 18D are views illustrating an in-field molding step SS20.

DESCRIPTION OF EMBODIMENTS

Hereinafter, the description is made with respect to respective embodiments of a method of manufacturing a polar anisotropic magnet, a method of manufacturing a magnet assembly, a polar anisotropic magnet, a magnet assembly and a composite magnet assembly with reference to drawings. The respective drawings are schematic views that illustrate one example, and do not necessarily strictly reflect actual sizes, ratios and the like. In FIG. 17 to FIG. 32B, broken lines or solid lines that are depicted in a magnet base material 10, magnet base material pieces 20, 30 and the like indicate the orientation directions (axis of easy magnetization) of molecules, and arrowed solid lines that are depicted in the magnet assembly and the polar anisotropic magnet indicate the magnetization directions.

A. Method of Manufacturing Polar Anisotropic Magnet by Four-Way Magnetization

First, a method of manufacturing a polar anisotropic magnet that is an element forming a magnet assembly by four-way magnetization is described.

Embodiment 1

1. Polar Anisotropic Magnets 1N, 1S and Magnet Assembly 100

Prior to the description of the method of manufacturing a polar anisotropic magnet, one example of polar anisotropic magnets 1N, 1S to be manufactured and a magnet assembly 100 (also referred to as a composite magnet assembly) is described.

(1) Magnet Assembly 100

Figure 1:
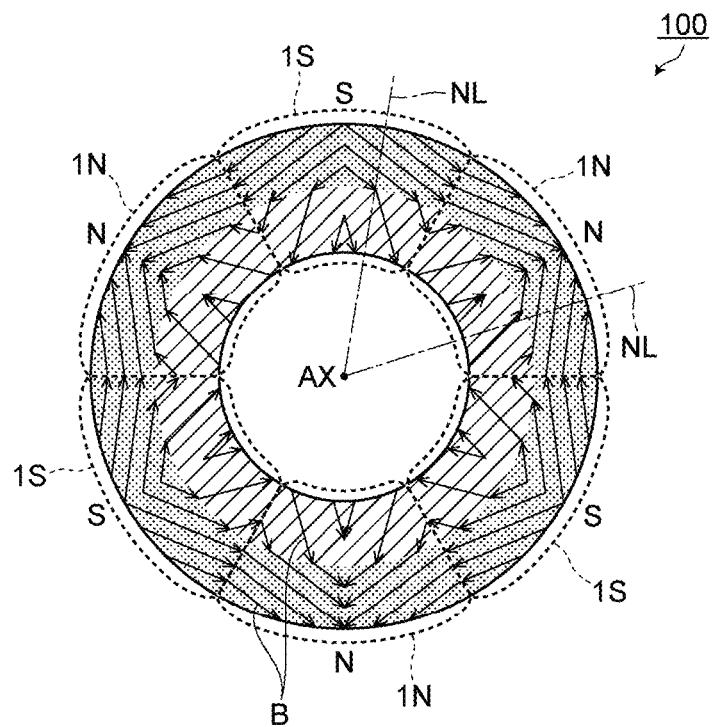
FIG. 1 is a cross-sectional view illustrating an example of a magnet assembly 100.

FIG. 1 is a cross-sectional view illustrating one example of a magnet assembly 100. In FIG. 1, arrows B depicted in polar anisotropic magnets 1N, 1S indicate the magnetization directions. The magnet assembly 100 illustrated in FIG. 1 can take out a magnetic characteristic substantially equal to the magnetic characteristic of the magnet assembly 900 illustrated in FIGS. 3A and 3B of the patent literature 1. In the method of manufacturing a polar anisotropic magnet according to the embodiment 1, the polar anisotropic magnets 1N, 1S are manufactured at a unit surrounded by a dotted line in FIG. 1.

(2) Pre-Magnetization Material 5 Having Straight-Line Molecular Orientation (Axis of Easy Magnetization)

Figure 2:
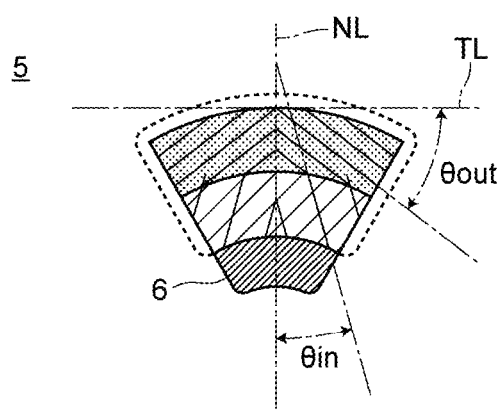
FIG. 2 is a cross-sectional view illustrating a mode of a pre-magnetization material 5 before becoming polar anisotropic magnets 1N, 1S by magnetization.

FIG. 2 is a view illustrating a portion that corresponds to one unit surrounded by a dotted line in FIG. 1, and is a cross-sectional view illustrating a mode of a pre-magnetization material 5 before the pre-magnetization material 5 becomes the polar anisotropic magnets 1N, 1S by magnetization. A bold solid line depicted in the pre-magnetization material 5 indicates the orientation of the molecules (axis of easy magnetization).

As illustrated in FIG. 2, assuming a case where the inside of the pre-magnetization material 5 is divided into four regions, in each region, the orientations of molecules (axes of easy magnetization) are straight lines and are arranged parallel to each other. In such a configuration, assume that an angle made between the molecular orientation (axis of easy magnetization) in a region on an outer diameter side and a tangent line TL at a center portion of an outer peripheral surface of the pre-magnetization material 5 as θout, and an angle made between the molecular orientation (axis of easy magnetization) in a region on an inner diameter side and a normal line NL at the center portion of the outer peripheral surface of the pre-magnetization material 5 as θin.

As one case of the embodiment, a soft magnetic body 6 having a split ring shape may be disposed on an inner diameter side of the pre-magnetization material 5. In this case, by setting θin to a value that exceeds 0 degrees, a thickness of the soft magnetic body 6 can be reduced. Further, by suitably changing a value of θout, a magnetic flux density form of lines of magnetic force outputted from the center portion of the outer peripheral surface that is the position indicated as the normal line NL can be changed.

By magnetizing the pre-magnetization material 5 corresponding to FIG. 2 described above by a suitable method, the polar anisotropic magnets 1N, 1S illustrated in FIGS. 3A and 3B described hereinafter can be formed.

Figure 3A:
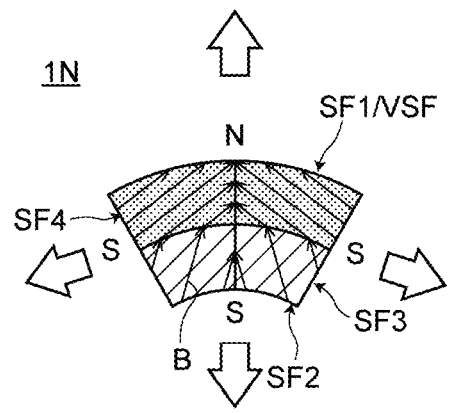
FIGS. 3A and 3B are views illustrating one example of the polar anisotropic magnets 1N, 1S.
Figure 3B:
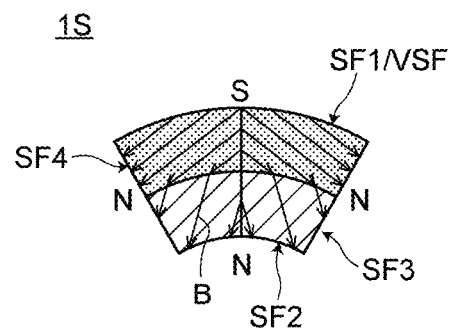

(3) Polar Anisotropic Magnets 1N, 1S Having Straight-Line Magnetization Direction FIGS. 3A and 3B are views illustrating one example of polar anisotropic magnets 1N, 1S. FIG. 3A and FIG. 3B illustrate the polar anisotropic magnets 1N, 1S respectively. In FIGS. 3A and 3B, arrows B depicted in the polar anisotropic magnets 1N, 1S indicate the magnetization direction.

As illustrated in FIG. 3A, the polar anisotropic magnet 1N has four surfaces SF1, SF2, SF3, and SF4 as viewed in a cross section. These four surfaces SF1, SF2, SF3, and SF4 face four directions (indicated by a bold arrow) respectively.

Here, "four surfaces" mean four approximately flat surfaces. When each surface is viewed in cross section, a profile that each surface forms may be a straight line or a curved line. Further, a plurality of straight lines or curved lines may be partially deflected. For example, a continuous straight line or a curved line that is deflected within 90° may be treated approximately as one surface.

The shape illustrated in FIG. 2 and FIGS. 3A and 3B is a "desired shape of the polar anisotropic magnet". Here, the "desired shape of the polar anisotropic magnet" is a so-called circular arc shape. That is, FIG. 2 and FIGS. 3A and 3B illustrate an example of a split ring shape obtained by equally dividing a circular ring by N (N being a natural number of 2 or more) as viewed in cross section. In a case where the polar anisotropic magnets 1N, 1S are used as a circular cylindrical rotor, for example, the first surface SF1 forms an outer peripheral surface, and the second surface SF2 forms an inner peripheral surface.

Here, among four surfaces, the surface on which a magnetic flux is designed to be generated in a concentrated manner is defined as an "effective surface VSF". In the polar anisotropic magnets 1N, 1S according to the embodiment 1, a magnetic flux is generated in a concentrated manner toward the outside from a region in the vicinity of the center of the effective surface VSF (first surface SF1).

When the polar anisotropic magnets 1N, 1S are used as a rotor of an electric machine such as a motor, the effective surface VSF is disposed on a side where the effective surface VSF faces a stator. In a case where the effective surface VSF is disposed on an outer peripheral surface side (first surface SF1), the polar anisotropic magnets can be preferably used as an inner rotor. On the other hand, in a case where the effective surface VSF is disposed on an inner peripheral surface side (second surface SF2), the polar anisotropic magnets can be preferably used as an outer rotor.

In the polar anisotropic magnet 1N illustrated in FIG. 3A, the first surface SF1 forms the effective surface VSF. An N pole (one magnetic pole) is disposed on the effective surface VSF (first surface SF1), and an S pole (the other magnetic pole) is disposed on the remaining surfaces other than the effective surface VSF, that is, the second surface SF2, the third surface SF3 and the fourth surface SF4. On the other hand, in the polar anisotropic magnet 1S illustrated in FIG. 3B, the polar anisotropic magnet 1S is magnetized in the magnetization direction reverse to the magnetization direction of the polar anisotropic magnet 1N. Accordingly, an S pole (one magnetic pole) is disposed on the effective surface VSF (first surface SF1), and an N pole (the other pole) is disposed on the remaining surfaces other than the effective surface VSF, that is, the second surface SF2, the third surface SF3 and the fourth surface SF4.

The polar anisotropic magnets 1S, 1N illustrated in FIGS. 3A and 3B are also objects of this embodiment 1.

Figure 4A:
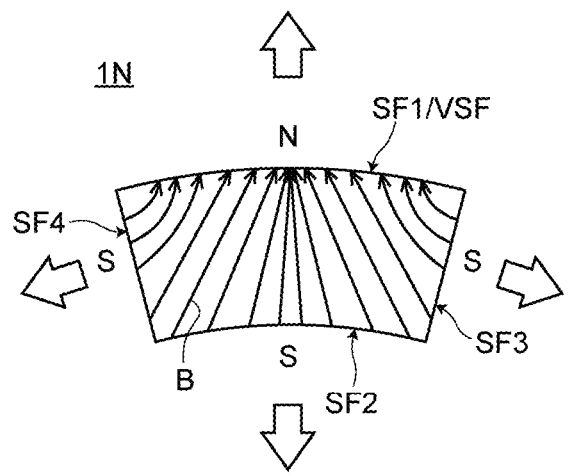
FIGS. 4A and 4B are views illustrating another example of the polar anisotropic magnets 1N, 1S.
Figure 4B:
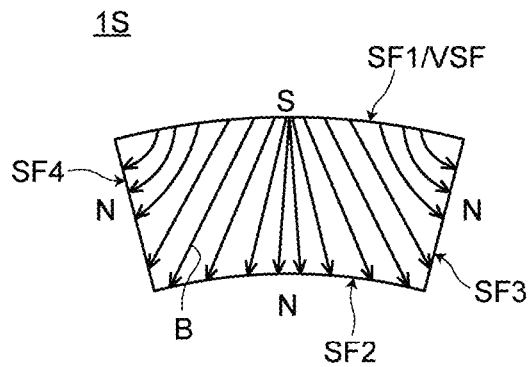

(4) Another Polar Anisotropic Magnets 1N, 1S Having Curved-Line Magnetization Direction FIGS. 4A and 4B are views illustrating another example of polar anisotropic magnets 1N, 1S.

In FIGS. 3A and 3B, the polar anisotropic magnets 1N, 1S having a straight-line magnetization direction are illustrated. As the polar anisotropic magnets that have substantially the same configuration as the polar anisotropic magnets 1N, 1S illustrated in FIGS. 3A and 3B, anisotropic magnets 1N, 1S illustrated in FIGS. 4A and 4B are also considered where the polar anisotropic magnets 1N, 1S form a curved line when the magnetization direction of the inside is traced. Another polar anisotropic magnets 1N, 1S having such configuration and magnetic characteristics are also objects of this embodiment 1. The description of four surfaces (SF1, SF2, SF3, SF4), the effective surface VSF and the like according to another polar anisotropic magnets 1N, 1S illustrated in FIGS. 4A and 4B also uses the description of the polar anisotropic magnets 1N, 1S illustrated in the above-mentioned FIGS. 3A and 3B.

The detailed description of the polar anisotropic magnets 1N, 1S and the magnet assembly 100 is made later.

2. Method of Manufacturing Polar Anisotropic Magnets According to Embodiment 1

Figure 5:
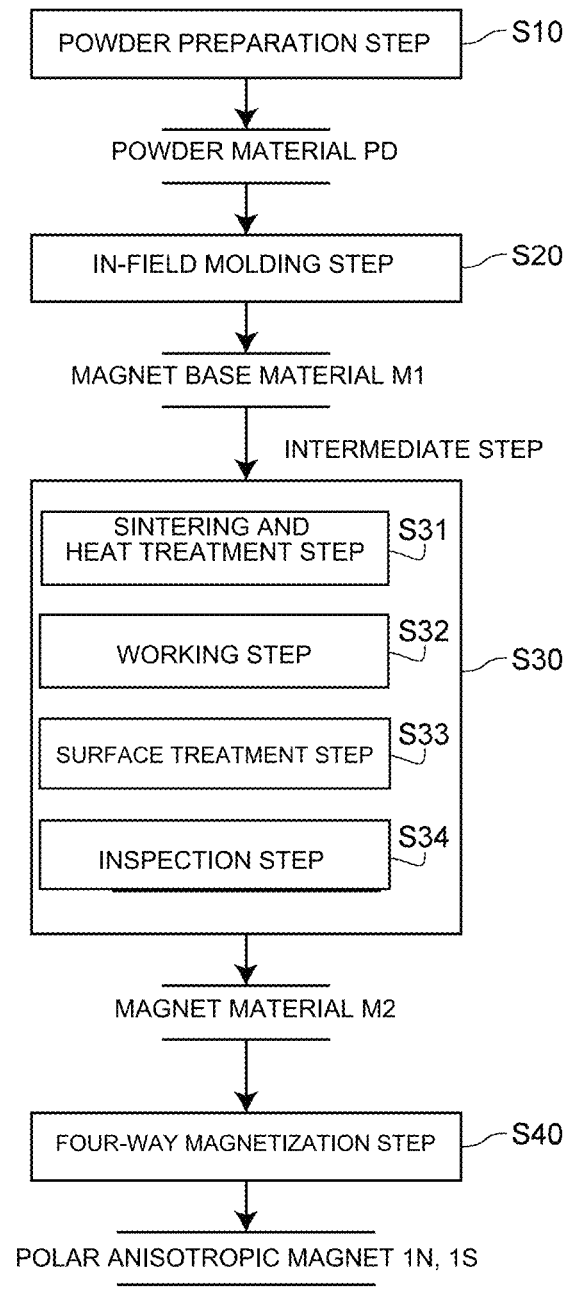
FIG. 5 is a flowchart illustrating a method of manufacturing a polar anisotropic magnet according to an embodiment 1.
Figure 9:
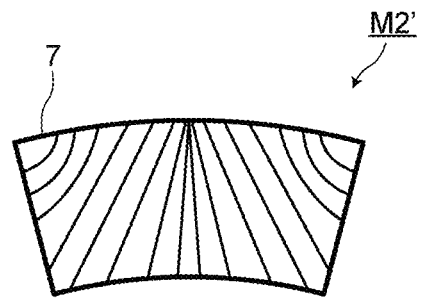
FIG. 9 is a schematic view of a magnet base material M2' taken out after a surface treatment step S33 is performed.
Figure 10:
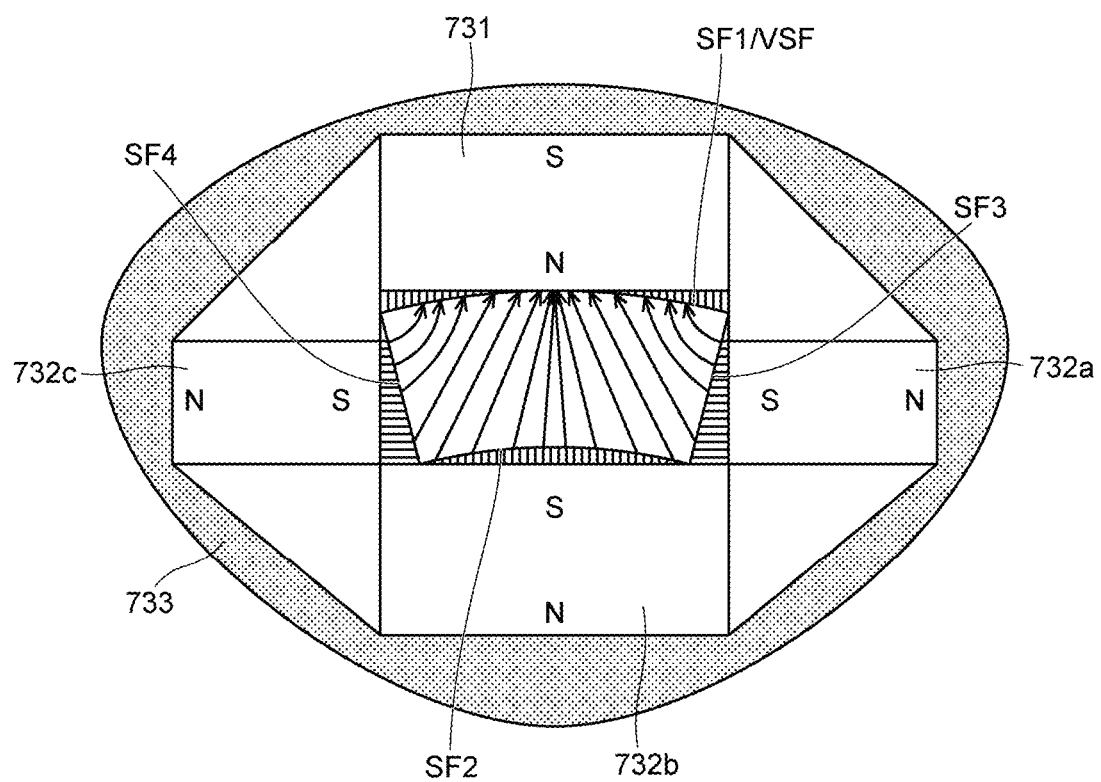
FIG. 10 is schematic cross-sectional view illustrating a mode where a four-way magnetization step S40 is performed.

FIG. 5 is a flowchart illustrating a method of manufacturing the polar anisotropic magnet according to the embodiment 1. FIG. 6 is a schematic cross-sectional view illustrating a mode where an in-field molding step S20 is performed. FIG. 7 is a schematic view of a magnet base material M1 taken out after the in-field molding step S20 is performed. FIGS. 8A and 8B are schematic views of a magnetic material M2 taken out after a working step S32 is performed. A double-dashed chained line in FIGS. 8A and 8B indicates a profile that was an outer shape of the magnet base material M1. FIG. 9 is a schematic view of a magnet material M2' taken out after a surface treatment step S33 is performed. FIG. 10 is a schematic cross-sectional view illustrating a mode where a four-way magnetization step S40 is performed.

As illustrated in FIG. 5, the method of manufacturing a polar anisotropic magnet according to the embodiment 1 includes at least a powder material preparation step S10, the in-field molding step S20, and the four-way magnetization step S40 in this order. In the embodiment 1, the method of manufacturing a polar anisotropic magnet further includes an intermediate step S30 (for example, a sintering and heat treatment step S31) between the in-field molding step S20 and the four-way magnetization step S40.

(1) Powder Material Preparation Step S10

The powder material preparation step S10 is a step for preparing a powder material PD for a magnet. The preparation of the powder material for the magnet can adopt an existing general method. For example, assuming a neodymium magnet, materials such as neodymium, iron, boron and the like are dissolved and, thereafter, solidified. Then, a solidified material is roughly crushed and finely crushed using a crusher, a mill, and the like thus preparing the powder material PD for the magnet.

(2) In-Field Molding Step S20

The in-field molding step S20 is a step for molding the magnet base material M1 having a shape that traces a mold 710. From the outside of the mold 710 corresponding to a desired shape of the polar anisotropic magnet, a magnetic field in a first direction is applied to a virtual effective surface VSF' (a term "virtual" being used since an original shape of the polar anisotropic magnet is not yet formed), and a magnetic field in a second direction is applied to remaining three surfaces, and while applying such magnetic fields in the first direction, the powder material PD is sequentially charged in the mold 710 thus molding the magnet base material M1 (see FIG. 5, FIG. 6).

As illustrated in FIG. 6 as the specific configuration, the mold 710 that corresponds to "a desired shape of the polar anisotropic magnet" is prepared. On the outside of the mold 710, a first magnetic source 721 is disposed such that the first magnetic pole faces the virtual effective surface VSF', and second magnetic sources 722b, 722a, 722c are respectively disposed such that the second magnetic pole faces the respective remaining three surfaces besides the virtual effective surface (a lower surface, a right side surface, a left side surface in the drawing) among four surfaces. In FIG. 6, an example is illustrated where the first magnetic pole is a N pole and the second magnetic pole is an S pole.

After completing such an arrangement, a magnetic field in a first direction is applied to the virtual effective surface VSF' by the first magnetic source 721, and the magnetic field in the second direction is applied to remaining three surfaces by the second magnetic source 722 respectively, and while applying such magnetic fields, the powder material PD is sequentially charged in the mold 710, and the magnet base material M1 having the shape that traces the mold 710 is molded.

Before the powder material PD is charged in the mold 710, a bonding agent (a binder) is mixed into the powder material PD. When the powder material PD is charged in the mold 710 to which a predetermined magnetic field is applied, the directions of respective molecules of the powder material PD are aligned in the direction of the magnetic field and the powder is stacked. In such a step, a pressure is applied from the outside of the mold 710.

By performing the in-field molding step S20 in this manner, for example, the magnet base material M1 illustrated in FIG. 7 can be obtained. A solid line in the magnet base material M1 illustrated in FIG. 7 schematically indicates the arrangement direction of molecules (the orientation of the molecules).

Widths of the first magnetic source 721 and the second magnetic source 722, and the arrangement positions of the first magnetic pole (a portion that becomes a peak) of the first magnetic source 721 and the second magnetic pole (a portion that becomes a peak) of the second magnetic source 722 with respect to the mold 710 can be suitably changed corresponding to a design concept. Further, the outputs (intensities of applied magnetic fields) of the first magnetic source 721 and the second magnetic source 722 on the respective surfaces can be set to suitable magnitudes (intensities of magnetic fields) corresponding to a design concept. In this case, the arrangement directions of molecules (molecule orientation/axis easy magnetization/magnet arrangement) can be easily and suitably changed by adjusting intensities of respective lines of magnetic force of the second magnetic sources 722b, 722a, 722c. As a result, designing of a magnetic flux density form of lines of magnetic force outputted from the effective surfaces VSF of the polar anisotropic magnets 1N, 1S can be suitably changed.

Here, "the first direction" and "the second direction" indicate either one of the direction directed toward the inside of the mold 710 and the direction directed toward the outside of the mold 710. The first direction and the second direction are reverse to each other. In example illustrated in FIG. 6, "the first direction" is the direction that lines of magnetic force are directed from the first magnetic pole of the first magnetic source 721 toward the inside of the mold 710, and "the second direction" is the direction that lines of magnetic force are directed from the inside of the mold 710 toward the second magnetic pole of the second magnetic source 722. "The first direction" and "the second direction" are not limited to the directions with respect to the mold 710 as described above, and "the first direction" and "the second direction" are defined also as the directions with respect to the magnet materials M2, M2' in the same manner.

By arranging the inner peripheral surface SF2 and outer peripheral surface SF1 such that the inner peripheral surface SF2 faces the first magnetic source 721 and the outer peripheral surface SF1 faces the second magnetic source 722b, it is also possible to form a polar anisotropic magnet having the effective surface VSF on the inner peripheral surface SF2. Such a modification is applicable in a modified form to a four-way magnetization step S40 (FIG. 10 and the like) described later.

(3) Intermediate Step S30

The intermediate step S30 is a step where intermediate treatment for charging the magnet base material M1 obtained in the in-field molding step S20 into the four-way magnetization step S40 described later (see FIG. 5).

In the embodiment 1, the sintering and heat treatment step S31 is performed for applying the sintering and the heat treatment to the magnet base material M1 (see FIG. 7) obtained in the in-field molding step S20. When the sintering and heat treatment step S31 is performed, the bonding agent (the binder) contained in the magnet base material M1 is vaporized by heat and is eliminated so that purity of the material of the magnetic body can be increased. Further, as a result of performing in-field molding, there may be also a case where the magnetization slightly remains in the magnet base material M1. However, such magnetization can be eliminated by performing the sintering and heat treatment step S31.

In the embodiment 1, subsequent to the sintering and heat treatment step S31, working step S32 is performed for forming a magnetic material M2 by forming the magnet base material M1 to which the sintering and heat treatment is applied into "a desired shape of a polar anisotropic magnet" (see FIGS. 8A and 8B). Then, surface treatment step S33 is performed for forming a magnet material M2' by applying surface treatment (for example, nickel plating, bright chromate treatment, electrodeposition coating or the like) for rust prevention to the magnet material M2 (see FIG. 9, symbol 7 indicating a surface treatment layer). Finally, inspection step S34 is performed for inspecting a finished state of the magnetic material M2'.

In a case where an inner side shape of the mold 710 is "a desired shape of a polar anisotropic magnet", working step S32 may not be performed. Further, surface treatment step S33 may not be performed.

(4) Four-Way Magnetization Step S40

The four-way magnetization step S40 is a step where the magnet materials M2, M2' are magnetized by applying a magnetic field in the first direction to the effective surface VSF (SF1) of the magnet materials M2, M2' and by applying a magnetic field in the second direction to remaining three surfaces (SF2, SF3, SF4) such that the magnetic field in the first direction and the magnetic field in the second direction surround the magnetic materials M2, M2' obtained based on the magnet base material (see FIG. 5 and FIG. 10).

As a specific configuration, as illustrated in FIG. 10, first, a magnetization-use first magnetic source 731 is disposed such that the first magnetic pole faces the effective surface VSF (first surface SF1), and magnetization-use second magnetic sources 732b, 732a, 732c are respectively disposed such that the second magnetic pole faces the respective surfaces of remaining three surfaces (the second surface SF2, the third surface SF3, and the fourth surface SF4) such that the magnetization-use first magnetic source 731 and the magnetization-use second magnetic sources 732b, 732a, 732c surround the magnetic materials M2, M2' obtained based on the magnet base material M1. As the magnetization-use first magnetic source 731 and the magnetization-use second magnetic sources 732b, 732a, 732c, a so-called magnetization yoke may be adopted.

After such a step is finished, the magnet material M2 is magnetized in such a manner that the magnetic field in the first direction is applied to the effective surface VSF (first surface SF1) and the magnetic field in the second direction is applied to remaining three surfaces (the second surface SF2, the third surface SF3, the fourth surface SF4) by operating the magnetization-use first magnetic source 731 and the magnetization-use second magnetic sources 732a, 732b, 732c.

With respect to the manner of applying the electric fields, existing methods can be suitably adopted. Further, the description of the first magnetic pole, the second magnetic pole, the first direction and the second direction is also used in the description in the in-field molding step S20.

By performing the four-way magnetization step S40 in this manner, it is possible to acquire the polar anisotropic magnet 1N or 2N illustrated in FIG. 2 or FIGS. 3A and 3B.

Widths of the magnetization-use first magnetic source 731 and the magnetization-use second magnetic source 732, and the arrangement positions of a first magnetic pole (a portion that becomes a peak) of the magnetization-use first magnetic source 731 and a second magnetic pole (a portion that becomes a peak) of the magnetization-use second magnetic source 732 can be suitably changed corresponding to a design concept. Further, the outputs (intensities of applied magnetic fields) of the magnetization-use first magnetic source 731 and the magnetization-use second magnetic source 732 on the respective surfaces can be set to suitable magnitudes (intensities of magnetic fields) corresponding to a design concept.

By suitably performing such adjustment, thicknesses of portions that are in a horizontal-system polar anisotropic arrangement when the polar anisotropic magnets 1N, 1S are completed, and thicknesses of portions that are in a vertical-system radial anisotropic arrangement can be arbitrarily set, and densities of virtual lines indicating the magnetization directions can be suitably changed.

With respect to the above-mentioned description and the drawings corresponding to the description, the description is made by taking the case where the polar anisotropic magnet 1N is manufactured as an example. However, also in the case of manufacturing the polar anisotropic magnet 1S, the polar anisotropic magnet 1S can be manufactured by switching the first magnetic pole to an S pole and the second magnetic pole to an N pole and by reversing the first direction and the second direction.

3. Polar Anisotropic Magnets 1N and 1S According to Embodiment 1

Next, returning to FIGS. 4A and 4B, the configurations of the polar anisotropic magnets 1N, 1S obtained by the above-mentioned method of manufacturing a polar anisotropic magnet are described supplementarily.

The polar anisotropic magnet 1N, 1S is a polar anisotropic magnet that has four surfaces (the first surface SF1, the second surface SF2, the third surface SF3, the fourth surface SF4) that respectively face four directions (bold arrows) as viewed in cross section. Among four surfaces SF1, SF2, SF3, and SF4 of the polar anisotropic magnet 1N, 1S, when the surface on which a magnetic flux is designed to be generated in a concentrated manner is set as the effective surface VSF (SF1), one magnetic pole is disposed on the effective surface VSF (SF1). Among four surfaces, the other magnetic pole is disposed on remaining three surfaces (SF2, SF3, and SF4) other than the effective surface VSF respectively. When one magnetic pole is an N pole, the other magnetic pole becomes an S pole. Reversely, when one magnetic pole is an S pole, the other magnetic pole becomes an N pole.

With respect to the polar anisotropic magnet 1N, 1S, treated in the description of the embodiment 1, the polar anisotropic magnet 1N, 1S has a divided ring shape obtained by equally dividing a circular ring by N (N being a natural number of 2 or more) as viewed in cross section. In such a configuration, in a case where the polar anisotropic magnet 1N, 1S is used as a circular cylindrical rotor, for example, the first surface SF1 forms an outer peripheral surface, and the second surface SF2 forms an inner peripheral surface.

As illustrated in FIG. 2 and FIGS. 3A and 3B, for example, in a portion ranging from an area in the vicinity of an upper side of the third surface SF3 to an area close to the center of the first surface SF1, the magnetization direction becomes the direction relatively close to horizontal and hence, the portion adopts the so-called horizontal-system polar anisotropic arrangement. On the other hand, for example, a portion in the vicinity of a lower side of the third surface SF3 and a portion in the vicinity of the second surface SF2 adopts the magnetization direction relatively close to vertical and hence, these portions adopt so-called vertical-system radial anisotropic arrangement.

Further, when the polar anisotropic magnet 1N, 1S is viewed in cross section, there is no adhesion trace in the polar anisotropic magnet 1N, 1S so that the inside of the polar anisotropic magnet 1N, 1S is formed continuously. That is, the polar anisotropic magnet 1N, 1S forms one continuous solid member.

4. Advantageous Effects Obtained by Method of Manufacturing Polar Anisotropic Magnet, Polar Anisotropic Magnet, and Magnet Assembly According to Embodiment 1

The method of manufacturing a polar anisotropic magnet according to the embodiment 1 is performed such that the magnetic forces (the first magnetic source 721 or the magnetization-use first magnetic source 731) is arranged such that the first magnetic pole faces the effective surface VSF (including the virtual effective surface VSF') (SF1), the magnetic source (the second magnetic source 722 or the magnetization-use second magnetic source 732) is arranged such that the second magnetic pole faces remaining three surfaces SF2, SF3, and SF4 other than the effective surface VSF (SF1), and the magnetic field in the first direction is applied to the effective surface VSF, and the magnetic field in the second direction is applied to remaining three surfaces.

Accordingly, the method of manufacturing a polar anisotropic magnet according to the embodiment 1 can collectively manufacture the polar anisotropic magnets 1N, 1S having both the portion where the horizontal-system polar anisotropic arrangement therein is adopted, and the portion where the vertical-system radial anisotropic arrangement is adopted together. Accordingly, compared to a conventional method of manufacturing a magnet assembly of Halbach arrangement and a magnet assembly similar to such a magnet assembly, mass productivity of magnet assembly can be remarkably enhanced.

Further, by suitably changing the positions where the magnetic sources (the first magnetic force 721, the second magnetic force 722, the magnetization-use first magnetic source 731, and the magnetization-use second magnetic source 732) are arranged with respect to four respective surfaces SF1, SF2, and SF4 and by suitably changing outputs (intensities of applied magnetic field) of the respective magnetic sources, both the thickness of the portion where the horizontal-system polar anisotropic arrangement is adopted and the thickness of the portion where the vertical-system radial anisotropic arrangement is adopted can be suitably changed.

That is, there is no possibility that the method of manufacturing the polar anisotropic magnet receives the restriction on designing similar to a trade-off between the wall thickness in the radial direction of the circular cylindrical body 900EX on the outer peripheral side and the wall thickness of the circular cylindrical body 900IN on the inner peripheral side adopted by the method of manufacturing the magnet assembly 900 described in Patent Literature 1.

As has been described above, according to the method of manufacturing a polar anisotropic magnet according to the embodiment 1, mass productivity can be enhanced. Further, the degree of freedom in designing the thickness of the horizontal-system polar anisotropic arrangement and the thickness of the vertical-system radial anisotropic arrangement can be also enhanced. That is, it is possible to provide a method of manufacturing a polar anisotropic magnet that exhibits high degree of freedom in designing and is highly economical.

Further, to obtain the magnet assembly 100 according to the embodiment 1, the polar anisotropic magnets 1N, 1S that differ in the magnetization direction from each other are joined to each other. In this case, for example, the S pole that appears on the third surface SF3 of the polar anisotropic magnet 1N and the N pole that appears on the fourth surface SF4 of the polar anisotropic magnet 1S attract each other and hence, the arrangement, the joining and the adhesion of the plurality of polar anisotropic magnets can be easily performed.

Accordingly, these points also contribute to the enhancement of mass productivity.

5. Magnet Assembly 100 According to Embodiment 1

Figure 11A:
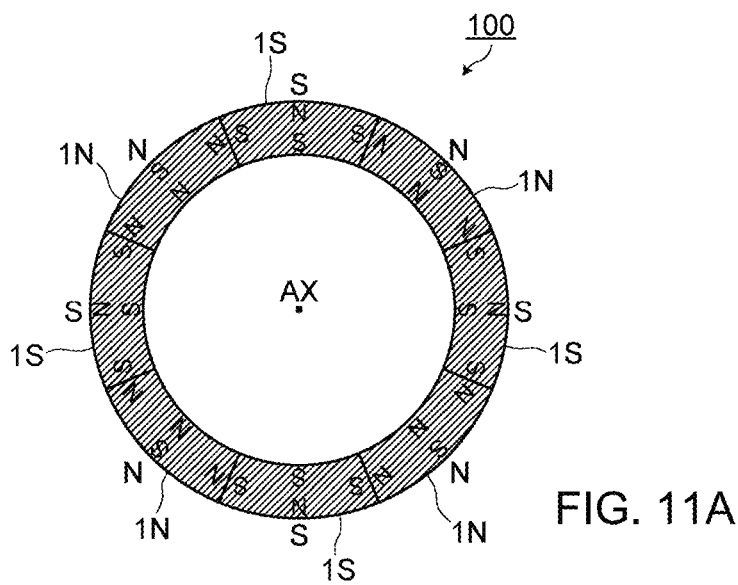
FIGS. 11A and 11B are views illustrating the magnet assembly 100 according to the embodiment 1.
Figure 11B:
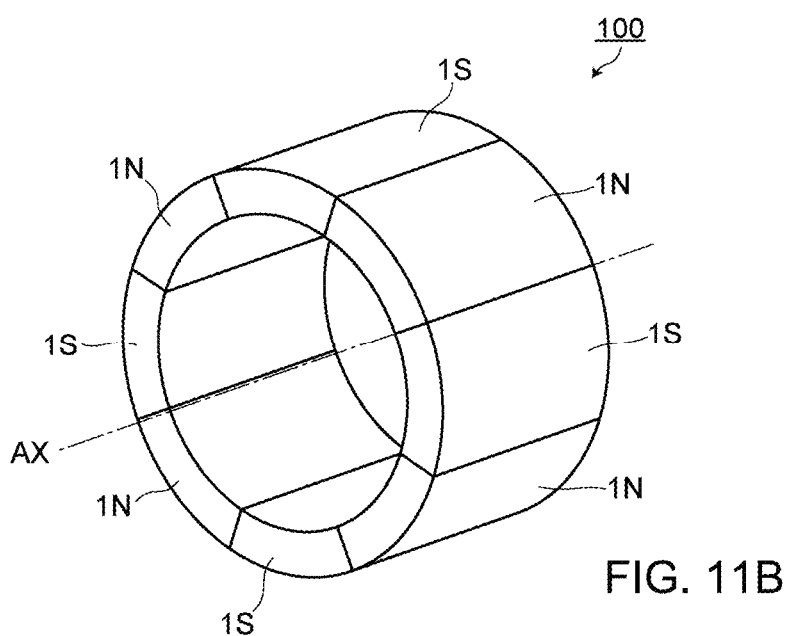

FIGS. 11A and 11B are views for describing the magnet assembly 100 according to the embodiment 1. FIG. 11A is a cross-sectional view of the magnet assembly 100, and FIG. 11B is a perspective view of the magnet assembly 100.

As illustrated in FIGS. 11A and 11B, in the magnet assembly 100, polar anisotropic magnets are arranged and are joined to each other such that one magnetic pole and the other magnetic pole alternately appear on an outer portion. Specifically, in the magnet assembly 100, the polar anisotropic magnet 1N and the polar anisotropic magnet 1S are alternately sequentially arranged along a predetermined direction, and two polar anisotropic magnets that are disposed adjacently to each other are magnetized reversely from each other.

In other words, in the magnet assembly 100, described above, the polar anisotropic magnets 1N, 1S are arranged along a circumferential direction about an axis AX, and an outer shape is formed into an approximately circular cylindrical shape.

In the above-mentioned configuration, the polar anisotropic magnets 1N and the polar anisotropic magnets 1S that are formed into a split ring shape by equally dividing a circular ring by 8 (N=8) are joined and are made to adhere to each other such that the third surface SF3 of the polar anisotropic magnet 1N and the fourth surface SF4 of the polar anisotropic magnet 1S are brought into contact with each other, and the first surfaces SF1 (effective surfaces VSF) of the polar anisotropic magnet 1N and the polar anisotropic magnet 1S form a coplanar surface (the first surfaces SF1 of the polar anisotropic magnet 1N and the polar anisotropic magnet 1S are being arranged not to form a gap at the joining portion.

Application Example

Figure 12A:
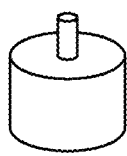
FIGS. 12A to 12C are views illustrating a motor 510, a generator 520 and an actuator 530 according to an application example.
Figure 12B:
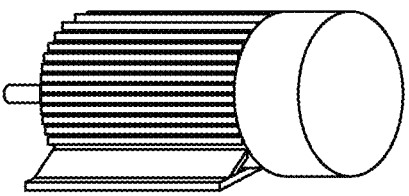
Figure 12C:
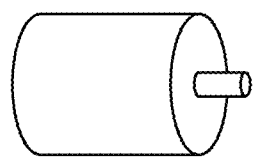

FIGS. 12A to 12C are views illustrating a motor 510, a generator 520 and an actuator 530 as application examples where the polar anisotropic magnets and the magnet assembly according to the respective embodiments are used.

The polar anisotropic magnets 1N, 1S and the magnet assembly 100 formed using these polar anisotropic magnet 1N, 1S that are obtained by the embodiment 1 are applicable to various product fields. For example, the polar anisotropic magnets 1N, 1S and the magnet assembly 100 can form a motor having a rotor that includes the magnet assembly 100 (see FIG. 12A), a generator having a rotor that includes the magnet assembly 100 (see FIG. 12B), and an actuator having a rotor that includes the magnet assembly 100 (FIG. 12C).

The present invention has been described with reference to the above-mentioned embodiment 1. However, the present invention is not limited to the above-mentioned embodiment 1. The present invention can be carried out in various modes without departing from the gist of the present invention. For example, the following modifications are also considered.
(1) In the in-field molding step S20 and/or the four-way magnetization step S40 according to the embodiment 1, the width of the first magnetic source 721 or the magnetization-use first magnetic source 731 on a side where the first magnetic pole is disposed is set substantially equal to the width of the effective surface VSF (including virtual effective surface). However, the present invention is not limited to such a configuration.

Figure 13:
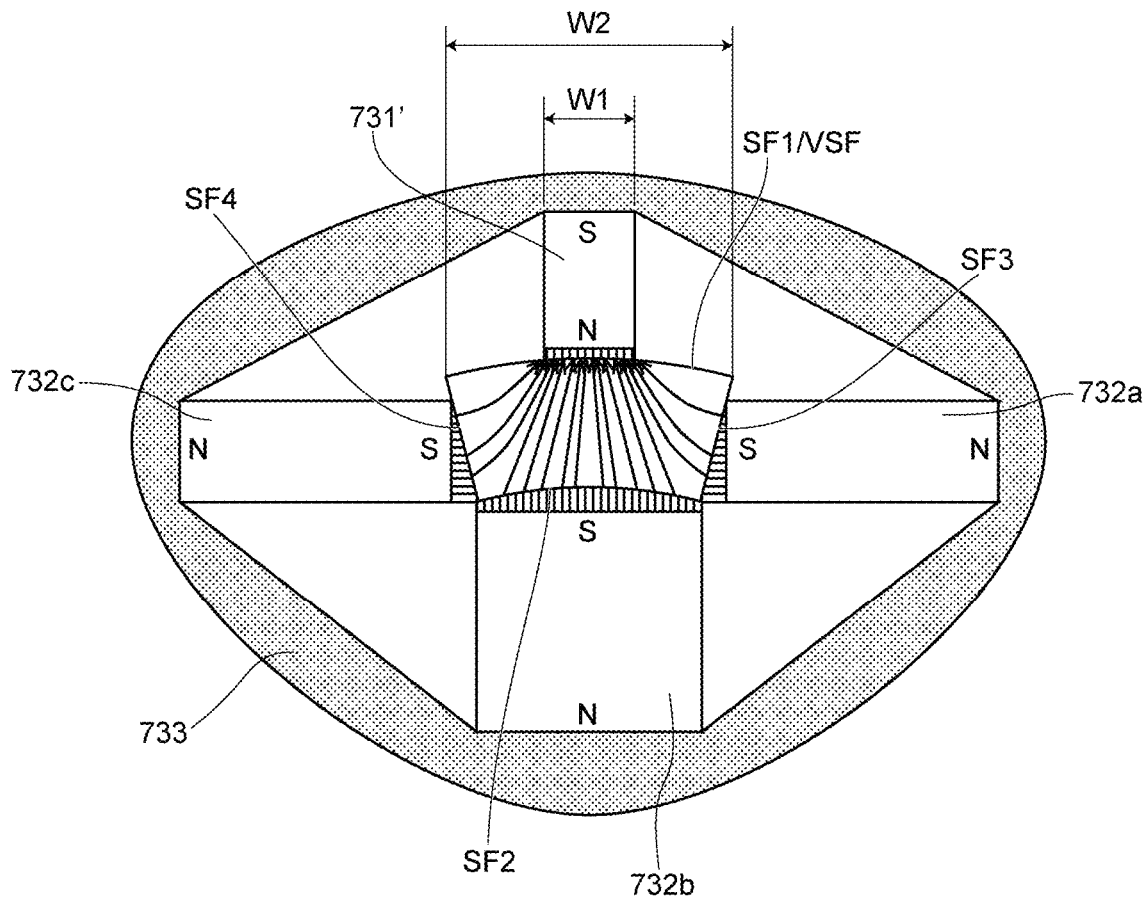
FIG. 13 is a view illustrating a modification of the method of performing the four-way magnetization step S40.

FIG. 13 is a view illustrating a modification of the method of performing the four-way magnetization step S40. For example, as illustrated in FIG. 13, in the four-way magnetization step S40, a width W1 of the magnetization-use first magnetic source 731 on a side where the first magnetic pole is disposed may be set smaller than a width W2 of the effective surface VSF. In other words, a magnetic field applying surface of the magnetization-use first magnetic source 731 that faces the effective surface VSF may be set so as to overlap with only a portion of the effective surface VSF.

With such a configuration, the degree of density of the distribution of magnetic flux density generated outside the effective surface VSF and the intensity of the lines of magnetic force can be adjusted.

In FIG. 13 and the above-mentioned description, the modification of the method of performing the four-way magnetization step S40 is described. However, substantially the same treatment may be performed also in the in-field molding step S20. That is, in the in-field molding step S20, a width of the first magnetic source 721 on the side where the first magnetic pole is disposed may be set smaller than a width of the virtual effective surface VSF'.

(2) In the method of manufacturing a polar anisotropic magnet according to the embodiment 1, the description has been made with respect to the method of manufacturing a polar anisotropic magnet that is capable of generating a magnetic flux of high density outside an outer periphery of the circular cylinder when the polar anisotropic magnets each having a strip ring shape that are parts of the cylindrical magnet assembly 100 are combined to each other so as to form the magnet assembly 100. However, the present invention is not limited to such a configuration. For example, in the in-field molding step S20 and the four-way magnetization step S40, the second surface SF2 is set as the effective surface VSF, remaining three surfaces other than the effective surface VSF are set as the first surface SF1, the third surface SF3 and the fourth surface SF4, and setting of polarities of the respective magnetic sources, the magnetization-use magnetic sources and the electric fields to be applied are changed so that the lines of orientations of molecules and lines of the magnetization directions are concentrated on an inner peripheral side of the circular arcuate polar anisotropic magnets. In this case, it is possible to manufacture a polar anisotropic magnet that can generate a magnetic flux of high density inside the inner periphery of the circular cylindrical body. Such a polar anisotropic magnet can preferably be used as an outer rotor, for example.

Figure 14A:
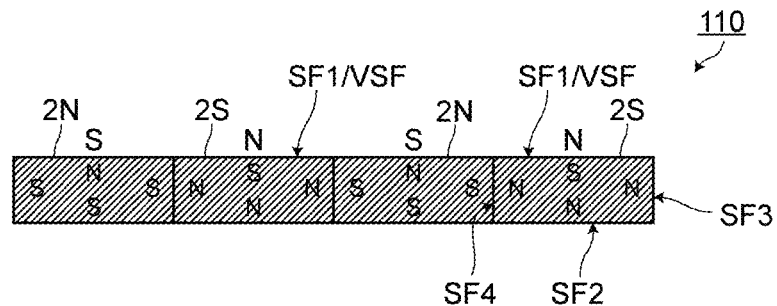
FIGS. 14A and 14B are views illustrating magnet assemblies 110, 120 according to a modification.
Figure 14B:
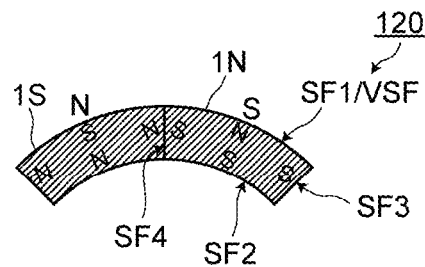

(3) The magnet assembly 100 according to the embodiment 1 has been described by taking a magnet assembly having a circular cylindrical shape. However, the present invention is not limited to such a configuration. For example, the present invention is applicable to a linear-type magnet assembly 110 illustrated in FIG. 14A and a circular arcuate type magnet assembly 120 illustrated in FIG. 14B. FIGS. 14A and 14B are views for illustrating the magnet assemblies 110, 120 according to modifications.

(4) The method of manufacturing a polar anisotropic magnet, the polar anisotropic magnets 1N, 1S, and the magnet assembly 100 according to the embodiment 1 have been described corresponding to the magnet assembly 900 described in FIGS. 3A and 3B of patent literature 1. However, the present invention is not limited to such a case. For example, the method of manufacturing a polar anisotropic magnet according to the embodiment 1 is also applicable to a magnet assembly that adopts a Halbach array, and a polar anisotropic magnet applied to a magnet assembly that is manufactured substantially based on a Halbach array.

(5) The method of manufacturing a polar anisotropic magnet and the polar anisotropic magnets 1N, 1S according to the present invention are also applicable to a magnet unit of a duplicate structure having magnetic fields that face each other.

Figure 15:
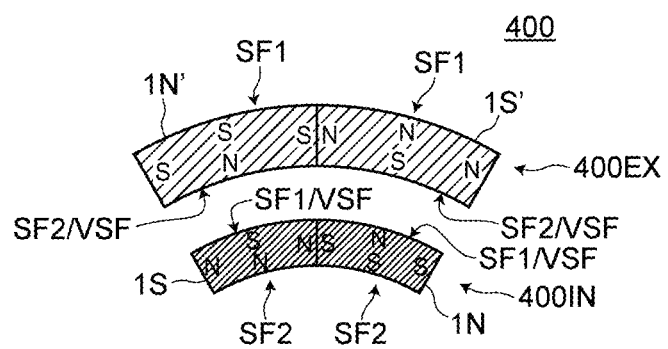
FIG. 15 is a view illustrating a magnet unit 400 having the duplicate structure having a circular cylindrical shape according to a modification.

FIG. 15 illustrates a magnet unit 400 of a duplicate structure having a circular cylindrical shape. The magnet unit 400 of a duplicate structure having a circular cylindrical shape includes a magnet assembly 400EX on an outer peripheral side, and a magnet assembly 400IN on an inner peripheral side. Polar anisotropic magnets 1N, 1N', 1S, 1S' that form the magnet assemblies 400EX, 400IN also can be obtained by the method of manufacturing a polar anisotropic magnet according to the present invention. The polar anisotropic magnets 1N, 1N', 1N, 1S, 1S' according to the present invention are applicable to the magnet assemblies 400EX, 400IN.

Figure 16:
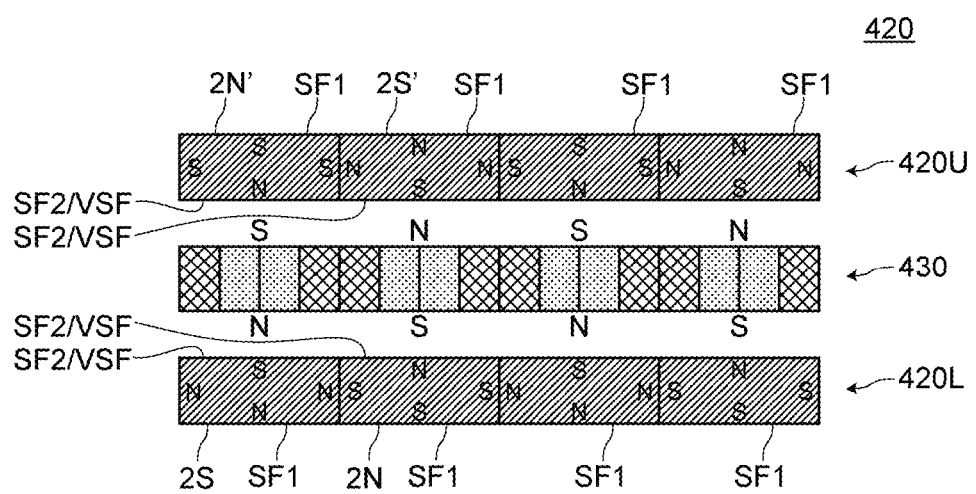
FIG. 16 is a view illustrating a magnet unit 420 having the duplicate structure having a linear shape according to a modification.

On the other hand, FIG. 16 illustrates the magnet unit 420 of a duplicate structure having a linear shape. The magnet unit 420 of a duplicate structure having a linear shape includes a magnet assembly 420U on an upper side (for the sake of description, "upper" and "lower" being used) and a magnet assembly 420L on a lower side, and the magnet assembly 430 disposed between the magnet assemblies 420U, 420L. Polar anisotropic magnets 2N, 2N', 2S, 2S' that form the magnet assemblies 4200, 420L also can be obtained by the method of manufacturing a polar anisotropic magnet according to the present invention. The polar anisotropic magnets 2N, 2N, 2S, 2S' according to the present invention are applicable to the magnet assemblies 4200, 420L.

(6) The polar anisotropic magnet having four-ways (four surfaces) as viewed in a cross-sectional view is described in the embodiment 1 and the modifications. However, the present invention is not limited to such a case. The embodiment 1 is not limited to the polar anisotropic magnet having four surfaces, and is applicable to a polar anisotropic magnet of a shape having three surfaces or five or more surfaces. For example, with respect to a magnet base material M1 and a magnet material M2 having three surfaces that form a triangle as viewed in cross section, and a magnet base material M1 and a magnet material M2 having six surfaces that form a hexagon as viewed in cross section, it is possible to apply a magnetic field in a first direction to one surface and, at the same time, to apply a magnetic field in a second direction to the remaining surfaces respectively. With such a configuration, it is possible to obtain a polar anisotropic magnet that has one magnetic pole (for example, an N pole) on one surface and the other magnetic pole (for example, an S pole) on the other surface respectively.

B. Method of Manufacturing Magnet Assembly Using Parallel Magnetic Fields and Cutting Technique Next, a method of manufacturing a magnet assembly using parallel magnetic fields and a cutting technique is disclosed.

Embodiment 2

1. Method of Manufacturing a Magnet Assembly According to the Embodiment 2

Figure 17:
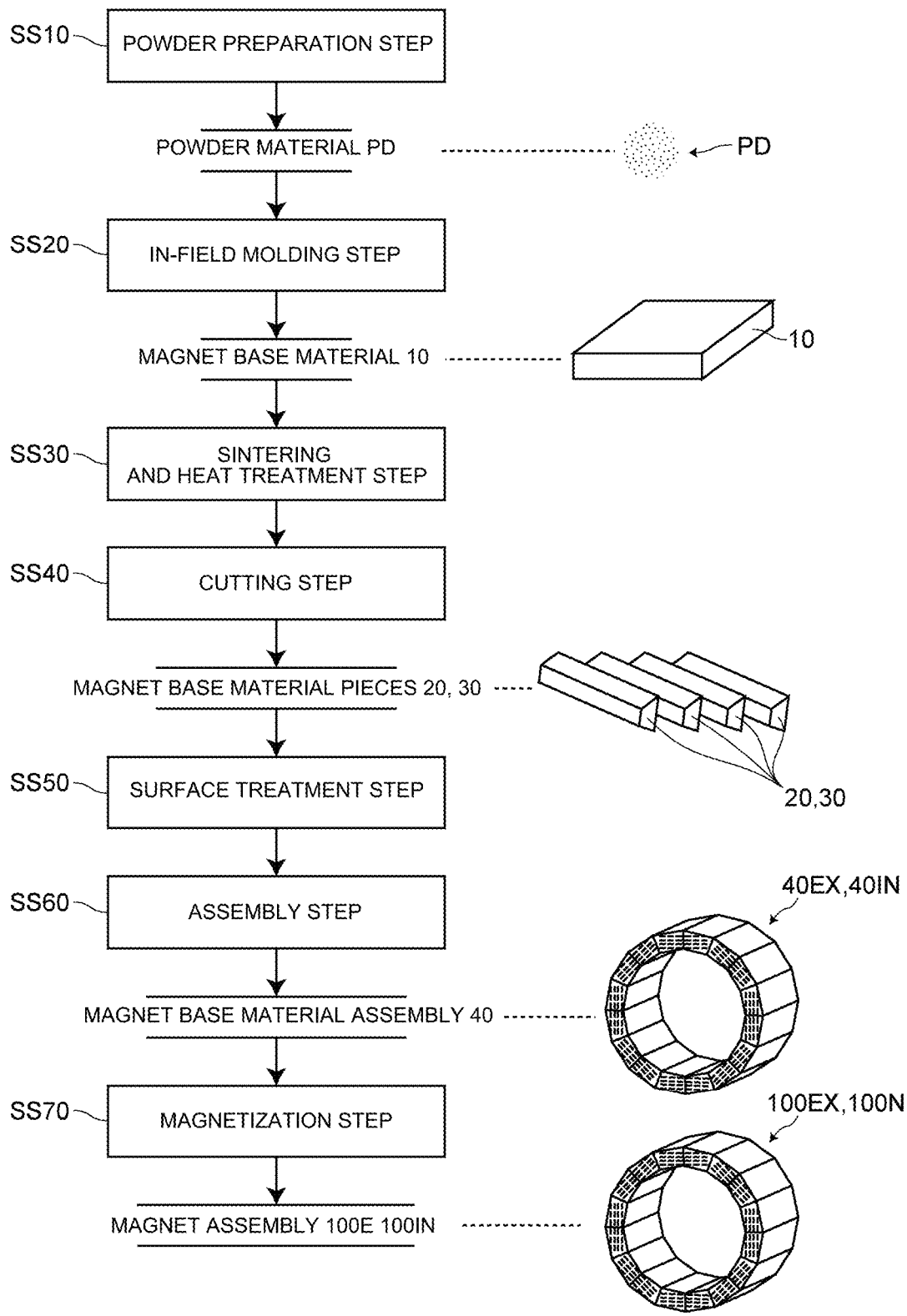
FIG. 17 is flowchart illustrating a method of manufacturing a magnet assembly according to an embodiment 2.

FIG. 17 is a flowchart illustrating the method of manufacturing a magnet assembly according to the embodiment 2. In the embodiment 2, hereinafter, the method of manufacturing a magnet assembly 100EX on an outer peripheral side is described.

The method of manufacturing a magnet assembly according to the embodiment 2 is a method of manufacturing the magnet assembly having a circular cylindrical shape.

As illustrated in FIG. 17, the method of manufacturing a magnet assembly according to the embodiment 2 includes at least a powder material preparation step SS10, an in-field molding step SS20, a cutting step SS40, an assembly step SS60, and a magnetization step SS70 in this order. In the embodiment 2, a sintering and heat treatment step SS30 is further included between the in-field molding step SS20 and the cutting step SS40. Further, a surface treatment step SS50 is included between the cutting step SS40 and the assembly step SS60. On a right side in FIG. 17, materials and members that are taken in and out from the predetermined steps are indicated.

(1) Powder Material Preparation Step SS10

The powder material preparation step SS10 is a step for preparing a powder material PD for a magnet. The preparation of the powder material for the magnet can adopt an existing general method. For example, assuming a neodymium magnet, materials such as neodymium, iron, boron and the like are dissolved and, thereafter, solidified. Then, a solidified material is roughly crushed and finely crushed using a crusher, a mill, and the like thus preparing the powder material PD for the magnet.

(2) In-Field Molding Step SS20

FIGS. 18A to 18D are views illustrating the in-field molding step SS20. FIG. 18A is a perspective view illustrating a mode of the in-field molding, FIG. 18B is a perspective view of a magnet base material 10, FIG. 18C is a cross-sectional view of the magnet base material 10 in FIG. 18B taken along a line an imaginary plane PL1, and FIG. 18D is a cross-sectional view of the magnet base material 10 in FIG. 18B taken along an imaginary plane PL2.

The in-field molding step SS20 is a step for molding a "magnet base material 10" having a first main surface 11 and a second main surface 12 on a side opposite to the first main surface 11 (see FIG. 18B). In the drawing, symbol 13*a* indicates an A side surface, symbol 13*b* indicates a B side surface, symbol 13*c* indicates a C side surface, and symbol 13*d* indicates a D side surface respectively.

In the in-field molding step SS20, the powder material PD prepared in the powder material preparation step SS10 is charged in a mold 890 (not illustrated in the drawing), and parallel magnetic fields in a single direction are applied from a side (an upper side in the drawing) corresponding to the first main surface 11 outside the mold 890 to a side (a lower side in the drawing) corresponding to the second main surface 12.

As the specific configuration, for example, a first magnetic source (not illustrated in the drawing) is arranged such that an N pole of the magnetic source faces to an outer side of the mold 890, that is, a side that becomes the first main surface 11 when the magnet base material 10 is formed by molding (the upper side of the mold 890 in the drawing), and a second magnetic source (not illustrated in the drawing) is arranged such that an S pole of the magnetic source faces a side that becomes the second main surface 12 when the magnet base material 10 is formed by molding (the lower side of the mold 890 in the drawing). Then, the first magnetic source and the second magnetic source are operated so as to uniformly apply a magnetic field over the whole first main surface 11 and the whole second main surface 12 perpendicular to the first main surface 11 and the second main surface 12 such that lines of magnetic force become parallel to each other and have the same flux density (see FIG. 18A). Although the case where the magnetic field is applied from the upper side to the lower side in the drawing exemplified in this embodiment, the direction of the magnetic field may be reversed.

When the above-mentioned magnetic field is applied under an environment where the inside of the mold 890 is pressurized, the respective molecules of the powder material PD are oriented along the direction of the magnetic field so as to be aligned in the direction of the magnetic field, and the magnet base material 10 having a shape corresponding to a shape of the mold 890 as a whole is molded (see FIG. 18B).

The first main surface 11 is formed of an approximately flat surface. The second main surface 12 is also formed of an approximately flat surface and is substantially parallel to the first main surface 11. However, the present invention is not limited to such a case. In the inside of the magnet base material 10, as indicated by a broken line in FIG. 18C and FIG. 18D, the directions of the molecules are oriented uniformly in the direction perpendicular to the first main surface 11 and the second main surface 12. Here, when the directions of the molecules are aligned, the magnet base material 10 is strongly magnetized along the arrangement direction by performing the magnetization step SS70 described later. In this manner, the directions of the respective powders (the orientation directions of the molecules) of the powder material PD that are aligned by performing the in-field molding step SS20 may be also referred to as "axis of easy magnetization" in this specification.

(3) Sintering and Heat Treatment Step SS30

In the sintering and heat treatment step SS30, the magnet base material 10 obtained in the in-field molding step SS20 is sintered and is subjected to heat treatment. When the sintering and heat treatment step SS30 is performed, a bonding agent (a binder) contained in the magnet base material 10 is vaporized by heat and is eliminated so that purity of the material of the magnetic body can be increased. Further, as a result of performing in-field molding, there may be also a case where the magnetization slightly remains in the magnet base material 10. However, such magnetization can be eliminated by performing the sintering and heat treatment.

(4) Cutting Step SS40

(4-1) Preparation Before Performing Cutting of Magnet Base Material Piece 20

Figure 19A:
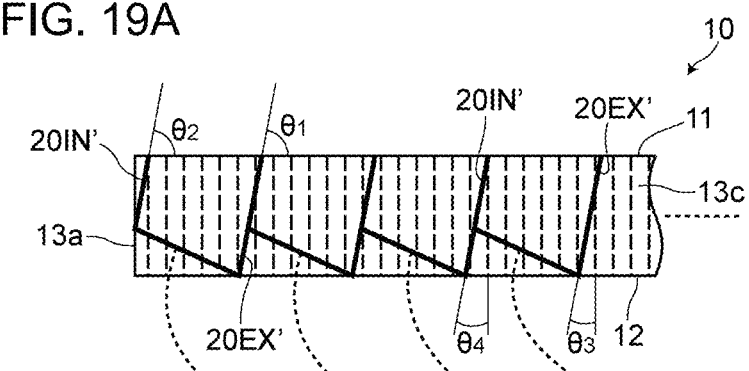
FIGS. 19A and 19B are views illustrating a cutting step SS40.
Figure 19B:
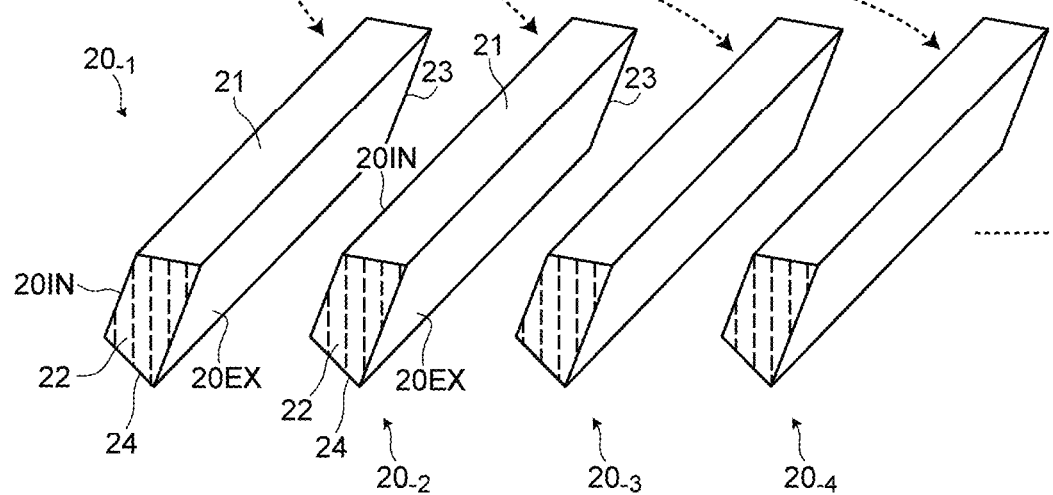

FIGS. 19A and 19B are views illustrating a cutting step SS40. FIG. 19A is a right side view of the magnet base material 10 before cutting as viewed in a direction perpendicular to the C side surface 13c. Solid lines (imaginary lines) drawn in a cross section of the magnet base material 10 are cutting lines along which cutting of the magnet base material 10 is performed in a cutting operation. The solid lines are so-called scribing lines. By cutting the magnet base material 10 along the cutting lines, a profile (an outer surface) of the magnet base material piece 20 (described later) appears to the outside. FIG. 19B is a perspective view illustrating the magnet base material pieces 20 obtained after performing the cutting step SS40.

The cutting step SS40 is a step of cutting out the magnet base material piece 20 described later by cutting the magnet base material 10 along the above-mentioned cutting lines.

In this embodiment, the cutting step SS40 is performed by wire cutting working. In performing wire cutting working, it is desirable to cut the magnet base material 10 while performing cooling. A method that can be adopted in the cutting step SS40 is not limited to wire cutting working. For example, water jet cutting working may be adopted, or shaving working may be adopted. By adopting these working, unlike the conventional method of manufacturing a magnet assembly, it is unnecessary to newly develop a mold each time the specification of a magnet assembly is changed. That is, the specification of a magnet assembly can be changed by a general-use magnet manufacturing facility.

(4-2) Setting Cutting Lines

Hereinafter, a surface that is scheduled to become an outer diameter surface of the magnet assembly when the magnet base material pieces 20 are assembled as the magnet assembly is defined as "scheduled outer diameter surface 20EX", and a surface that is scheduled to become an inner diameter surface of the magnet assembly when the magnet base material pieces 20 are assembled is defined as "scheduled inner diameter surface 20IN". The cutting lines corresponding to these surfaces before cutting are expressed by adding "'" to the corresponding symbols.

In the embodiment 2, cutting is performed such that scheduled outer diameter surface 20EX and/or the scheduled inner diameter surface 20IN are/is formed of a flat surface. By forming the scheduled outer diameter surface 20EX and the scheduled inner diameter surface 20IN into a flat surface, a cutting operation becomes simple compared to a case where the scheduled outer diameter surface 20EX and the scheduled inner diameter surface 20IN are formed into a curved surface. Accordingly, it is expected that productivity of the magnetic assemblies can be enhanced while ensuring high accuracy.

Further, in the embodiment 2, the scheduled outer diameter surface 20EX and the scheduled inner diameter surface 20IN are set parallel to each other.

As illustrated in FIG. 19A, the cutting line 20EX' of the scheduled outer diameter surface is set such that the cutting line 20EX' is inclined by an angle θ1 with respect to the first main surface 11. Further, the cutting line 20IN' of the scheduled inner diameter surface is set such that the cutting line 20IN' is inclined by an angle θ2 with respect to the first main surface 11. In the embodiment 2, the case is exemplified where the scheduled outer diameter surface and the scheduled inner diameter surface are parallel to each other. Accordingly, in this embodiment, the relationship of θ1=θ2 is established.

In this embodiment, the cutting lines are set with reference to the first main surface 11. However, in an actual operation, the cutting lines may be set with reference to either one of the first main surface 11 and the second main surface 12. Accordingly, also in this specification, it is possible to carry out the method of manufacturing a magnet assembly by exchanging "first main surface 11" with "second main surface 12". Such a case also falls within the scope of the present invention.

(4-3) Parameters of Cutting Line

In the cutting step SS40 according the embodiment 2, the angle θ1 and the angle θ2 with respect to the first main surface 11 are respectively set to values that fall within a range from more than 45 degrees to less than 90 degrees. Under such angle setting, the magnet base material 10 is cut along the cutting line 20EX' of the scheduled outer diameter surface and the cutting line 20IN' of the scheduled inner diameter surface.

In other words, in the cutting step SS40 according the embodiment 2, the cutting line 20EX' of the scheduled outer diameter surface is set to a value (angle θ3) that falls within a range from more than 0 degrees to less than 45 degrees with respect to an axis of easy magnetization (direction indicated by a broken line), and the cutting line 20IN' of the scheduled inner diameter surface is set to a value (angle θ4) that falls within a range from more than 0 degrees to less than 45 degrees with respect to the axis of easy magnetization. Under such angle setting, the magnet base material 10 is cut along the cutting line 20EX' of the scheduled outer diameter surface and the cutting line 20IN' of the scheduled inner diameter surface (see FIG. 19A).

By setting the angles θ1, θ2, θ3 and θ4 in this manner, the magnet assembly (magnet assembly on an outer peripheral side) that has a horizontal-system polar anisotropic orientation can be manufactured.

(4-4) Cutting of Magnet Base Material Piece

Next, after setting the cutting lines as described above, the magnet base material 10 is cut along the cutting lines 20EX' of the scheduled outer diameter surface and, at the same time, the magnet base material 10 is cut along the cutting lines 20IN' of the scheduled inner diameter surface thus cutting out the magnet base material pieces 20 each having at least the scheduled outer diameter surface 20EX and the scheduled inner diameter surface 20IN on an outer surface (see FIG. 19B).

As illustrated in FIG. 19B, the magnet base material pieces 20 that are cut out by the cutting step SS40 each have, on an outer surface thereof, joining side surfaces 21, 24 that are joined to each other in the succeeding assembly step SS60 besides the scheduled outer diameter surface 20EX and the scheduled inner diameter surface 20IN. In the example of the embodiment 2, the joining side surface 21 is a portion that was the same surface as the first main surface 11 of the magnet base material 10 before the cutting step SS40. That is, the joining side surface 24 is a surface that has newly appeared after another cutting line was set and cutting was performed along another cutting line. Further, the magnet base material piece 20 has a surface 22 on one end side in the longitudinal direction, and a surface 23 on the other end side in the longitudinal direction. FIGS. 19A and 19B illustrates the example where the plurality of magnet base material pieces 20-1, 20-2, 20-3 and 20-4 are cut out. However, the case where a single magnet base material piece is cut out is also included as a mode of the cutting step SS40 in this embodiment.

(5) Surface Treatment Step SS50

The surface treatment step is a step for applying surface treatment (for example, nickel plating, bright chromate treatment, electrodeposition coating, electrostatic coating or the like) for rust prevention to the magnet base material piece 20.

(6) Assembly Step SS60

Figure 20A:
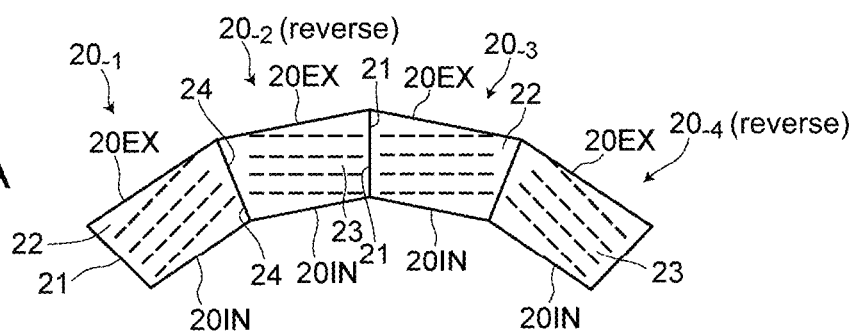
FIGS. 20A and 20B are views illustrating an assembly step SS60.
Figure 20B:
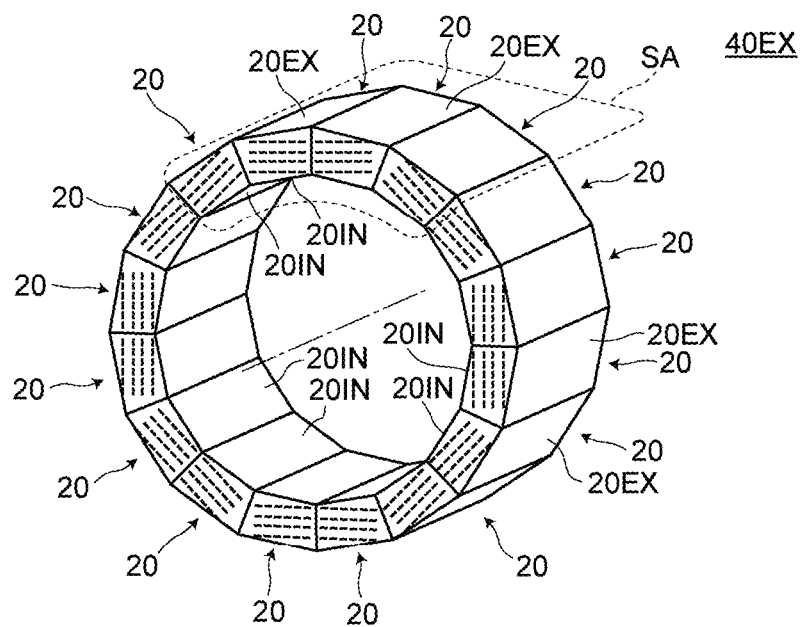

FIGS. 20A and 20B are views illustrating the assembly step SS60. FIG. 20A is a view illustrating a state where four magnet base material pieces 20 are assembled to each other. FIG. 20B is a perspective view illustrating the magnet base material assembly 40EX. For the sake of reference, a range indicated by a broken line SA in FIG. 20B takes the configuration illustrated in FIG. 20A.

The assembly step SS60 is a step of assembling a magnet base material assembly 40EX by combining the plurality of magnet base material pieces 20. Specifically, the plurality of magnet base material pieces 20 obtained by the cutting step SS40 are prepared (see FIG. 19B), and joining side surfaces 21, 24 of the magnet base material pieces 20 are joined to each other and are made to adhere to each other. In this case, the joining is performed in a state where there is no gap at a joining portion between the scheduled outer diameter surfaces 20EX that are disposed adjacently to each other and at a joining portion between the scheduled inner diameter surfaces 20IN that are disposed adjacently to each other (in a state where corners are permissive). By performing such a step, it is possible to form a continuous outer peripheral surface and a continuous inner peripheral surface by combining the plurality of magnet base material pieces 20 to each other.

As an example, the case is described where four pieces of the magnet base material pieces 20 in FIG. 19B are combined with each other (see FIG. 20A).

From a left side, first, the magnet base material piece $20_{-1}$ is disposed with the surface 22 on one end side disposed on a front side.

The magnet base material piece $20_{-2}$ is disposed on a right neighboring side with respect to the magnet base material piece $20_{-1}$. In this case, one end side and the other end side of the magnet base material piece $20_{-2}$ in the longitudinal direction are exchanged so that the surface 23 of the other end side of the magnet base material piece $20_{-2}$ is disposed on a front side. At this stage, the joining side surface 24 of the magnet base material piece $20_{-1}$ and the joining side surface 24 of the magnet base material piece $20_{-2}$ are joined to each other. Next, the magnet base material piece $20_{-3}$ is disposed on a right neighboring side with respect to the magnet base material piece $20_{-2}$ so that the front surface 22 of the one end side of the magnet piece $20_{-3}$ is disposed on a front side. At this stage, the joining side surface 21 of the magnet base material piece $20_{-2}$ and the joining surface 21 of the magnet base material piece $20_{-3}$ are joined to each other. Next, the magnet base material piece $20_{-4}$ is disposed on a right neighboring side of the magnet base material piece $20_{-3}$ such that one end side and the other end side of the magnet base material piece $20_{-4}$ are exchanged so that the other end side 23 of the magnet base material piece $20_{-4}$ is disposed on a front side. At this stage, the joining side surface 24 of the magnet base material piece $20_{-3}$ and the joining side surface 24 of the magnet base material piece $20_{-4}$ are joined to each other.

The magnet base material 20 is formed by assembling and combining four magnet base material pieces $20_{-1}$ to $20_{-4}$ to each other. By repeating such assembling operation, the magnet base material assembly 40EX illustrated in FIG. 20B can be obtained.

(7) Magnetization Step SS70

Figure 21A:
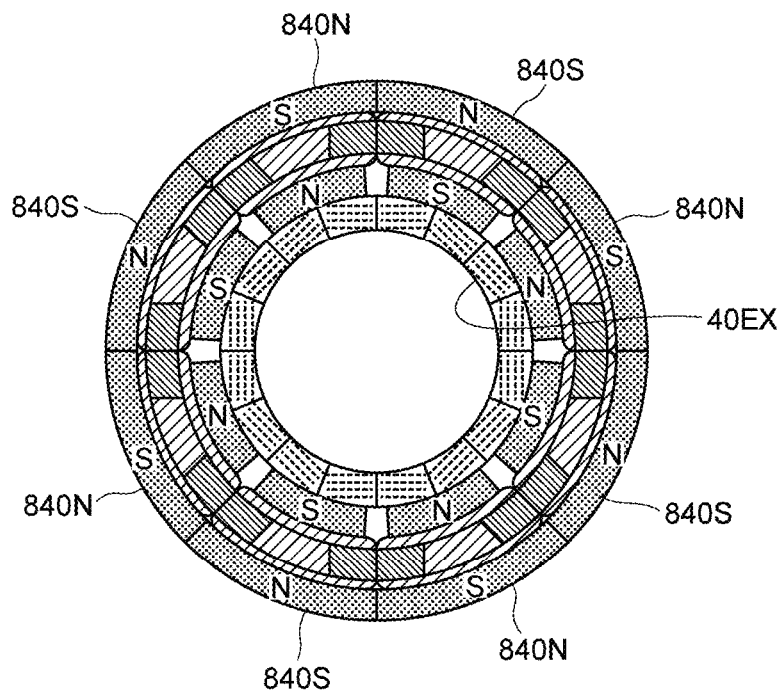
FIGS. 21A and 21B are views illustrating a magnetization step SS70.
Figure 21B:
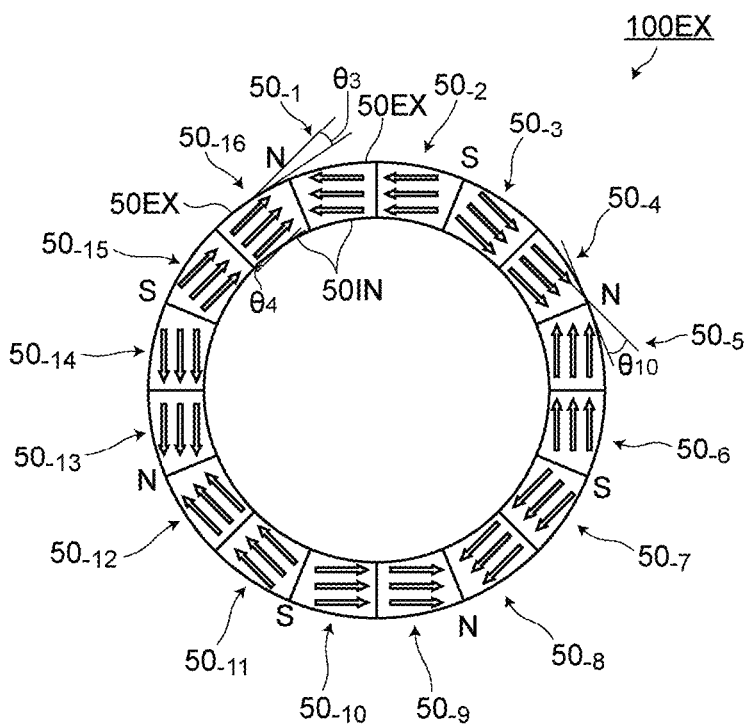

FIGS. 21A and 21B are views illustrating a magnetization step SS70. FIG. 21A is a cross-sectional view illustrating arrangement of magnetic sources 840N, 840S at the time of performing the magnetization. FIG. 21B is a cross-sectional view illustrating the magnet assembly 100EX after the magnetization step is performed.

The magnetization step SS70 is a step where the magnet base material assembly 40EX is magnetized by applying a predetermined magnetic field to the magnet base material assembly 40EX at a predetermined position outside the magnet base material assembly 40EX.

For example, as described in FIG. 21A, four pieces of magnetic sources 840N, and four pieces of 840S that are each formed of a magnetization yoke are arranged along an outer diameter surface (more strictly, a circumference about a center axis) of the magnet base material assembly 40EX in a state where polarities are alternately changed at an equal angle. Poles of the magnetic sources 840N, 840S are arranged at the positions where the poles approach the joining side surfaces 21, 24 as the poles advance from the center axis to the outside in the radial direction (the positions indicated by P1, P2 in FIG. 23A).

After such an operation is performed, the magnetic sources 840N, 840S are operated at a predetermined timing and with a predetermined output so as to apply a magnetic field to the magnet base material assembly 40EX. Accordingly, in the inside of the magnet base material assembly 40EX, it is possible to generate the magnetization along the orientation direction (axis of easy magnetization) of molecules formed in the in-field molding step SS20. As a result, it is possible to obtain the magnet assembly 100EX magnetized in the direction (magnetization direction) as illustrated in FIG. 21B.

By performing at least the in-field molding step SS20, the cutting step SS40, the assembly step SS60 and the magnetization step SS70, it is possible to obtain the magnet assembly 100EX.

2. Magnet Assembly 100EX

Next, the magnet assembly 100EX obtained by the method of manufacturing a magnet assembly according to the embodiment 2 is described.

As described in FIG. 21B, the magnet assembly 100EX includes magnet blocks 50 each of which has the outer diameter surface and the inner diameter surface respectively formed of an approximately flat surface. The magnet block 50 are magnetized at a predetermined angle (θ3, θ4)) with respect to the outer diameter surface and the inner diameter surface and parallel to each other in a single direction. The plurality of (N pieces in this embodiment) magnet blocks 50 are joined to each other by way of surfaces other than the outer diameter surface and the inner diameter surface (the joining side surfaces 21, 24 in FIG. 20A).

Specifically, the magnet assembly 100EX is formed by joining N pieces of magnet blocks 50 to each other, and is formed in a N-sided polygonal cylindrical shape such that an outer diameter side and an inner diameter side of the magnet assembly 100EX each have the N-sided polygonal cylindrical shape. The magnet assembly 100EX illustrated in FIG. 21B is a magnet assembly where ns (the number of sets that is the natural number of 1 or more) is set to 4 (ns=4) assuming nps (the number of same poles) is 2 (nps=2) and npNs (the number of different poles) is 2 (npNs=2) so that N is 16 (2×2×4=16).

Between the assembly step SS60 and the magnetization step SS70, a circular cylinder forming step (not illustrated in the drawings) for forming the magnet base material assembly 40EX into a circular cylindrical shape as a whole may be performed by shaving a corner of outer diameter surfaces of the magnet base material assembly 40EX that is formed in an approximately N-sided polygonal cylindrical shape, or by adhering a protective film or the like to the outer surfaces of the magnet base material assembly 40EX. In this case, the magnet assembly 100EX is also formed into a circular cylindrical shape correspondingly.

In the above-mentioned case, it is described that the magnet assembly 100EX is formed in an approximately N-sided polygonal cylindrical shape having an approximately flat-surface outer diameter surface. However, with respect to the magnet assembly 100, a magnet assembly where an outer diameter surface of a final shape are formed of curved surfaces and a magnet assembly where an outer diameter surface has an approximately circular cylindrical shape as a whole as a result of the circular cylinder forming step are also included in the mode of this embodiment since such magnet assemblies are each originally formed of an approximately flat surface and approximately N-sided polygonal cylindrical shape.

3. Advantageous Effects Acquired by Method of Manufacturing Magnet Assembly According to Embodiment 2

In the method of manufacturing a magnet assembly according to the embodiment 2, the magnet assembly 100EX is obtained in such a manner that the magnet base material 10 is molded by applying a magnetic field parallel in a single direction ranging from a side corresponding to the first main surface 11 to a side corresponding to the second main surface 12, the magnet base material piece 20 is cut out by cutting the magnet base material 10 after setting the cutting line 20EX' of the scheduled outer diameter surface such that the cutting line 20EX' has an inclination of an angle θ1 with respect to the first main surface 11 and by cutting also the magnet base material 10 after setting the cutting line 20IN' of the scheduled inner diameter surface such that the cutting line 20IN' has an inclination of an angle θ2 with respect to the first main surface 11 and, thereafter, the magnet base material assembly 40EX is assembled by combining the magnet base material pieces 20, and the magnetization is performed.

That is, once the magnet base material 10 having the molecular orientation direction (axis of easy magnetization) in the single direction is obtained, thereafter, a change in designing, a change in type of the magnet assembly can be performed by changing an angle of cutting, shapes of cuts and the like in the cutting step SS40. That is, the magnetization direction, the thickness, the shape of the magnet assembly can be suitably changed by merely suitably changing the manner of setting the cutting lines. Accordingly, the method of manufacturing a magnet assembly according to the present invention can obtain the high degree of freedom in designing.

In other words, while realizing the common use and the standardization up to steps from the powder material preparation step SS10, the in-field molding step SS20, and the sintering and heat treatment step SS30, by merely suitably changing the manner of setting cutting lines in the cutting step SS40, the magnet assembly 100EX on an outer peripheral side and the magnet assembly 100IN on an inner peripheral side can be separately manufactured. Accordingly, a large-scaled change in steps is unnecessary for each product variation.

Further, unlike the prior art, it is unnecessary to prepare a mold for each product variation, and the cutting step SS40 itself can be performed using a conventional general-use magnet manufacturing facility. Particularly, the method of manufacturing a magnet assembly according to the embodiment 2 is also useful in a case where a facility that is configured to manufacture a sintered magnet by so-called monopolar manufacturing is used. Further, the method of manufacturing a magnet assembly according to the embodiment 2 can easily perform a change in designing and hence, has the high degree of freedom in designing. Accordingly, a cost for development can be suppressed and a period necessary for development can be shortened so that the method of manufacturing a magnet assembly according to the embodiment 2 is also useful at development and prototype preparation stages.

In this manner, the method of manufacturing the magnet assembly according to the present invention is more economical than the prior art.

Further, even when a thickness of the magnet assembly 100EX to be assembled in the radial direction is thin, an angle of cutting, a shape of a cut and the like can be suitably changed and hence, although the magnet assembly has a thin thickness, the magnetization direction can be also freely controlled. For example, although it is difficult to manufacture a magnet assembly having the thickness T2 of 1 mm to 2 mm by a conventional method, such a magnet assembly can be manufactured by the method of manufacturing a magnet assembly according to the embodiment (see FIGS. 32A and 32B). Accordingly, also in this respect, the method of manufacturing a magnet assembly according to the embodiment 2 has the higher degree of freedom in designing than the prior art.

Further, unlike the prior art where sintering and heat treatment are performed in a state where the magnet assembly is formed of thick members, there is no possibility that the magnet assembly 100EX is broken in the sintering and heat treatment step. Accordingly, a yield can be enhanced compared to the prior art and hence, the method of manufacturing a magnet assembly according to the embodiment 2 is considerably economical.

Further, the parts treated in the assembly step SS60 are the magnet base material pieces 20 that are not magnetized and hence, the magnet base material pieces 20 are assembled to each other in a state where neither an attraction force nor a repulsive force exists. Accordingly, for example, a problem on an attraction force and a repulsive force between magnets disposed adjacently to each other that has existed in assembling magnets in Halbach array conventionally does not exist in the method of manufacturing a magnet assembly according to the embodiment 2 and hence, the magnet assembly 100EX can be extremely easily manufactured on a mass production basis.

In this manner, according to the method of manufacturing a magnet assembly according to the embodiment 2, it is possible to provide a method of manufacturing a magnet assembly that has the high degree of freedom in designing and is highly economical compared to the prior art.

Figure 32A:
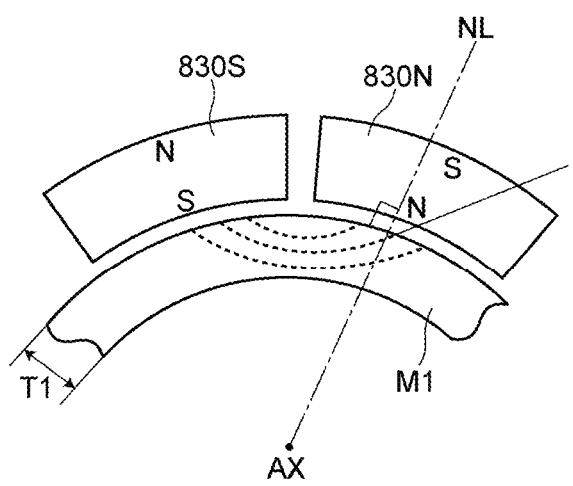
FIGS. 32A and 32B are schematic views illustrating a mode of orientation direction of a powder material in an in-field molding step by the conventional manufacturing method.
Figure 32B:
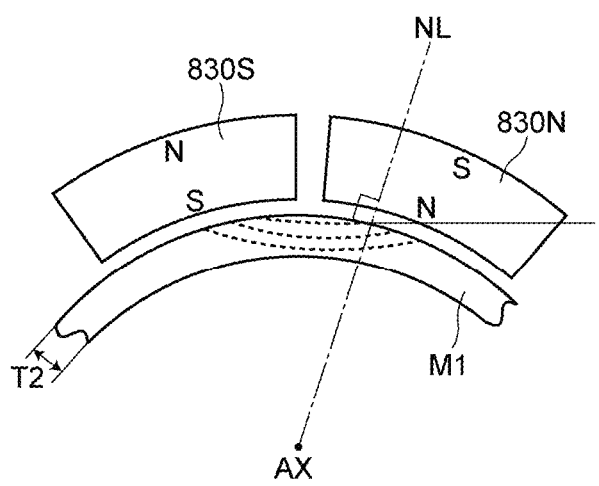

Further, conventionally, as described in FIGS. 32A and 32B, it is considered that the orientation direction (axis of easiness of magnetization) of the molecules is influenced by a change in the arrangement of a magnetic source, a magnitude of an output of the magnetic source, an outputting method and the like. It is considered that the individual differences are liable to be generated for respective products also in the magnetization direction due to such a change and hence, irregularities occur in quality among the products. However, in the method of manufacturing a magnet assembly according to the embodiment 2, a magnetic field that extends in a single direction and in parallel is simply applied to the magnet assembly and hence, the uniform orientation direction (axis of easiness of orientation) can be obtained in the magnet assembly and hence, the irregularities in quality can be suppressed whereby it is possible to maintain the magnet assembly at high quality.

Embodiment 3

Figure 22A:
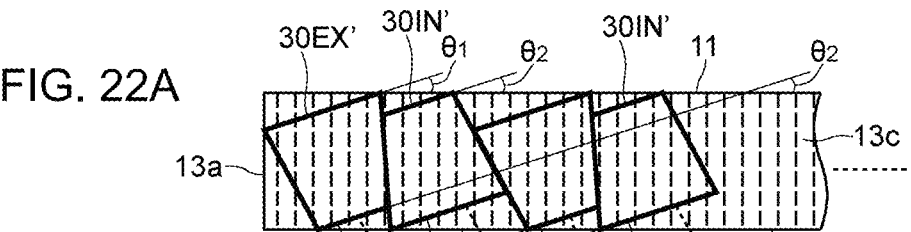
FIGS. 22A and 22B are cross-sectional views illustrating a mode of a cutting step SS40 according to an embodiment 3.
Figure 22B:
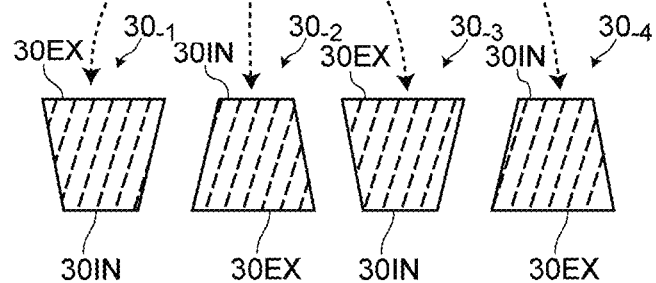
Figure 23A:
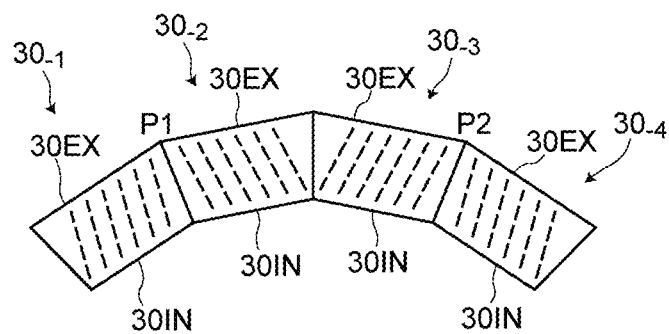
FIGS. 23A and 23B are cross-sectional views illustrating an assembly step SS60 according to the embodiment 3.
Figure 23B:
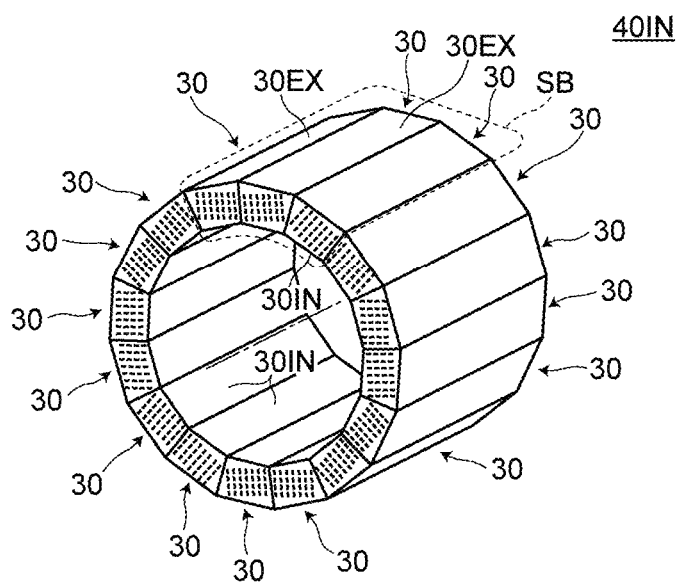
Figure 24:
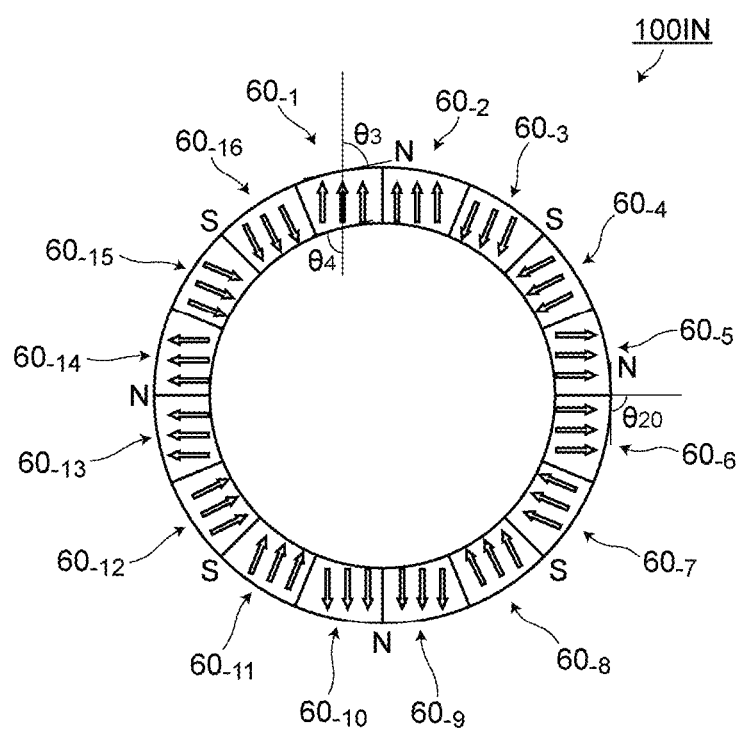
FIG. 24 is a cross-sectional view of a magnet assembly 100IN after a magnetization step SS70 according to the embodiment 3 is performed.

FIGS. 22A and 22B are cross-sectional views illustrating a mode of a cutting step SS40 according to an embodiment 3. FIG. 22A is a right side view as viewed in a direction perpendicular to a C side surface 13c of a magnet base material 10 before cutting. FIG. 22B is a cross-sectional view illustrating magnet base material pieces 30 obtained after performing the cutting step SS40. FIGS. 23A and 23B are cross-sectional views illustrating an assembly step SS60 according to the embodiment 3. FIG. 23A is a view illustrating a state where four magnet base material pieces 30 are combined to each other. FIG. 23B is a perspective view illustrating a magnet base material assembly 401N. FIG. 24 is a cross-sectional view of a magnet assembly 100IN after a magnetization step SS70 according to the embodiment 3 is performed. In the drawings, symbol 30EX indicates a scheduled outer diameter surface, and symbol 30IN indicates a scheduled inner diameter surface.

With respect to the constitutional elements having the same basic configurations and technical features as the embodiment 2, these constitutional elements are indicated by using the symbols in the embodiment 2 and the description of these constitutional elements is omitted.

The method of manufacturing a magnet assembly 100IN according to the embodiment 3 basically has substantially the same configuration as the method of manufacturing a magnet assembly 100EX according to the embodiment 2. However, the method of manufacturing a magnet assembly according to the embodiment 3 differs from the method of manufacturing a magnet assembly 100EX according to the embodiment 2 with respect to setting of an angle, a shape and the like of cuts in the cutting step SS40.

That is, as illustrated in FIG. 22A, in the cutting step SS40, an angle θ1 of a cutting line 30EX' of a scheduled outer diameter surface with respect to a first main surface 11 and an angle θ2 of a cutting line 30IN' of a scheduled inner diameter surface with respect to the first main surface 11 are respectively set to values that fall within a range from 0 or more degrees to less than 45 degrees. Under such setting, a magnet base material 10 is cut along cutting lines 30EX' of the scheduled outer diameter surface and the cutting lines 30IN' of the scheduled inner diameter surface.

In other words, the cutting lines 30EX' of the scheduled outer diameter surface and the cutting lines 30IN' of the scheduled inner diameter surface are respectively set to values that fall a range more than 45 degrees to less than 90 degrees with respect to an axis of easy magnetization (a direction indicated by a broken line). Under such setting, the magnet base material 10 is cut along the cutting lines 30EX' of the scheduled outer diameter surface and the cutting lines 30IN' of the scheduled inner diameter surface.

The magnet base material pieces 30 obtained after performing the cutting step SS40 are illustrated in FIG. 22B. Then, by performing an assembly step SS60 in the same manner as the embodiment 2, a magnet base material assembly 40IN illustrated in FIG. 23B can be obtained. FIG. 23A corresponds to FIG. 20A, and FIG. 23B corresponds to FIG. 20B. Then, by performing the magnetization step SS70, the magnet assembly 100IN illustrated in FIG. 24 can be obtained.

In the method of manufacturing the magnet assembly 100IN according to the embodiment 3, the angle of the cutting lines is set as described above. Accordingly, it is possible to manufacture the magnet assembly (the magnet assembly 100IN on an inner peripheral side) having a vertical-system polar anisotropic orientation where the magnetization direction becomes closer to a direction perpendicular to the outer diameter surface. In the method of manufacturing a magnet assembly 100IN according to the embodiment 3, it may be possible to provide the configuration where the magnetization direction becomes 90 degrees with respect to the outer diameter surface (such that the magnetization direction is aligned with the radial direction).

The method of manufacturing the magnet assembly 100IN according to the embodiment 3 has substantially the same configuration as the method of manufacturing the magnet assembly 100EX according to the embodiment 2 except for setting of the angle, the shape and the like of the cuts in the cutting step SS40. Accordingly, the method of manufacturing the magnet assembly 100IN according to the embodiment 3 directly acquires the corresponding advantageous effects found amongst all advantageous effects that the method of manufacturing the magnet assembly 100EX according to the embodiment 2 acquires.

Embodiment 4

Figure 30:
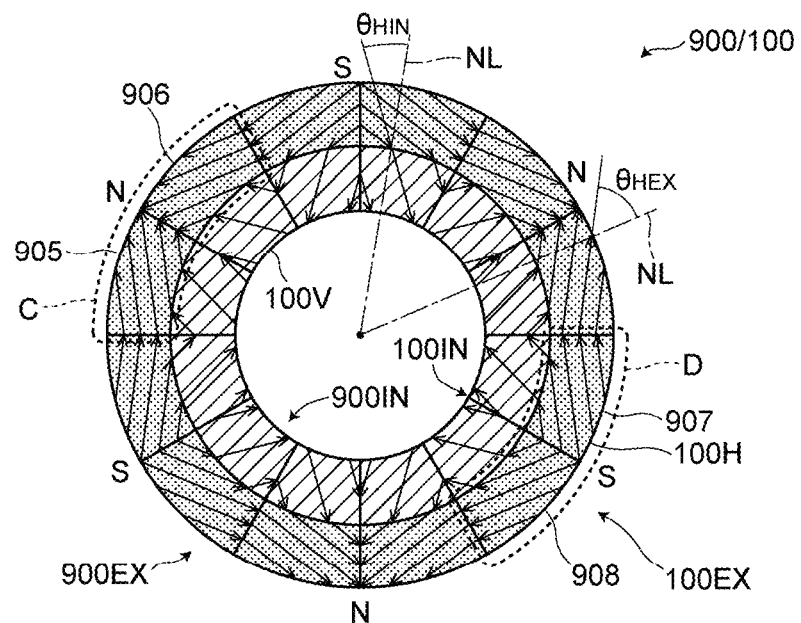
FIG. 30 is a cross-sectional view illustrating a magnet assembly 900 described in patent literature 1.
Figure 31:
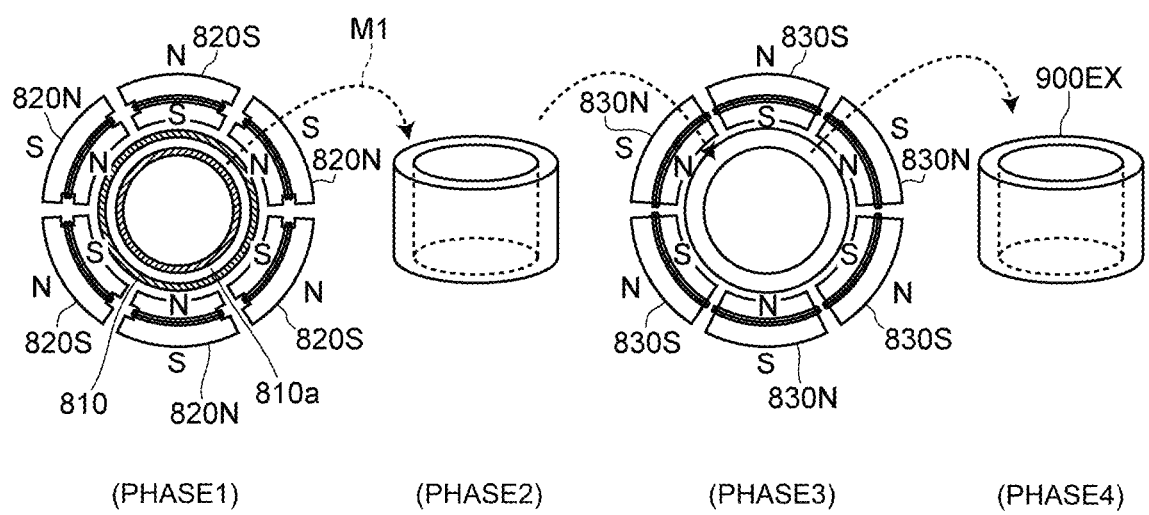
FIG. 31 is a view illustrating a conventional method of manufacturing a magnet assembly 900EX.

By combining the magnet assembly 100EX obtained by the embodiment 2 and the magnet assembly 100IN obtained by the embodiment 3, a composite magnet assembly 100 similar to the magnet assembly 900 described in patent literature 1 can be obtained (see FIG. 30).

As described in FIG. 30, the composite magnet assembly 100 is formed by joining N pieces of magnet blocks 50, 60 (see FIG. 21B and FIG. 24) to each other where an outer peripheral side and an inner peripheral side are each formed into an N-side polygonal shape by the magnet assembly.

Here, assuming that nps (the number of same poles) is 2 (nps=2), npNs (the number of different poles) is 2 (npNs=2), and ns is the number of sets (the number of sets being a natural number of 1 or more), N is a natural number that satisfies the relationship of N=nps×npNs×ns.

(1) The composite magnet assembly 100 includes: the magnet assembly 100EX of the first mode that is obtained by the embodiment 2 where the angles of magnetization directions with respect to the outer diameter surface and the inner diameter surface in the respective magnetic block 50 are set to first angles (angles close to 0); and the magnet assembly 100IN of the second mode that is obtained by the embodiment 3 where the angles of magnetization directions with respect to the outer diameter surface and the inner diameter surface in the respective magnetic block 60 are set to second angles (angles close to 90 degrees) that are different from the first angles.

Then, the composite magnet assembly 100 is formed such that, the magnet assembly 100EX according to the first mode is disposed on a side that is scheduled to form an effective H magnetic flux surface 100H of the composite magnet assembly 100; and the magnet assembly 100IN according to the second mode is disposed on a side that is scheduled to form an effective V magnetic flux surface 100V of the composite magnet assembly 100, and the magnet assembly 100EX and the magnet assembly 100IN are joined to each other (see FIG. 30).

Here, "effective H magnetic flux surface" is an outer surface of the composite magnet assembly 100 where the magnetization direction in the composite magnet assembly just below the surface is directed in a direction close to a horizontal (H) direction with respect to the outer surface. On the other hand, "effective V magnetic flux surface" is an outer surface of the composite magnet assembly 100 where the magnetization direction in the composite magnet assembly just below the surface is directed in a direction close to a vertical (V) direction with respect to the outer surface. In the example illustrated in FIG. 30, the cylindrical composite magnet assembly 100 is exemplified where the surface on the outer peripheral surface is set as the effective H magnetic flux surface 100H, and the surface on the inner peripheral surface is set as the effective V magnetic flux surface 100V. Such a composite magnet assembly 100 can be suitably used as an inner rotor.

Here, "first angle (θ10)" is an angle θ10 made between a tangent line at a position of a magnetic pole that appears on the outer peripheral surface (outer diameter surface) of the magnet assembly 100EX and a magnetization direction in the magnet block disposed adjacently to a position just below the position of the magnetic pole. In FIG. 21B, for example, the magnetic pole N appears on an outer peripheral side of a joined portion between a magnetic block 50-4 and a magnetic block 50-5, and θ10 illustrated at the position of such a magnetic pole N corresponds to the first angle.

In the same manner, "second angle (θ20)" is an angle θ20 made between a tangent line at a position of a magnetic pole that appears on the outer peripheral surface (outer diameter surface) of the magnet assembly 100IN and a magnetization direction in the magnet block disposed adjacently to a position just below the position of the magnetic pole. In FIG. 24, for example, the magnetic pole N appears on an outer peripheral surface side of a joined portion between the magnetic block 60-5 and the magnetic block 60-6, and θ20 illustrated at the position of such an magnetic pole N corresponds to the second angle.

The above description has been made using the outer peripheral surface (outer diameter surface) as the reference. However, the substantially same definition can be made also with respect to the case where the inner peripheral surface (inner diameter surface) is used as the reference.

(2) The composite magnet assembly 100 described above in an exemplified manner is a composite magnet assembly of a type where a surface on an outer peripheral side is set as the effective H magnetic flux surface 100H. However, the embodiment 4 is not limited to such a composite magnet assembly. For example, by setting the first angle θ10 to an angle close to 90 degrees and by setting the second angle θ20 to an angle close to 0 degrees, it is possible to form a composite magnet assembly of a different mode by setting a surface on an inner peripheral side as an effective H magnetic flux surface (not illustrated in the drawing). Such a composite magnet assembly can be suitably used as an outer rotor.

Embodiment 5

Figure 25:
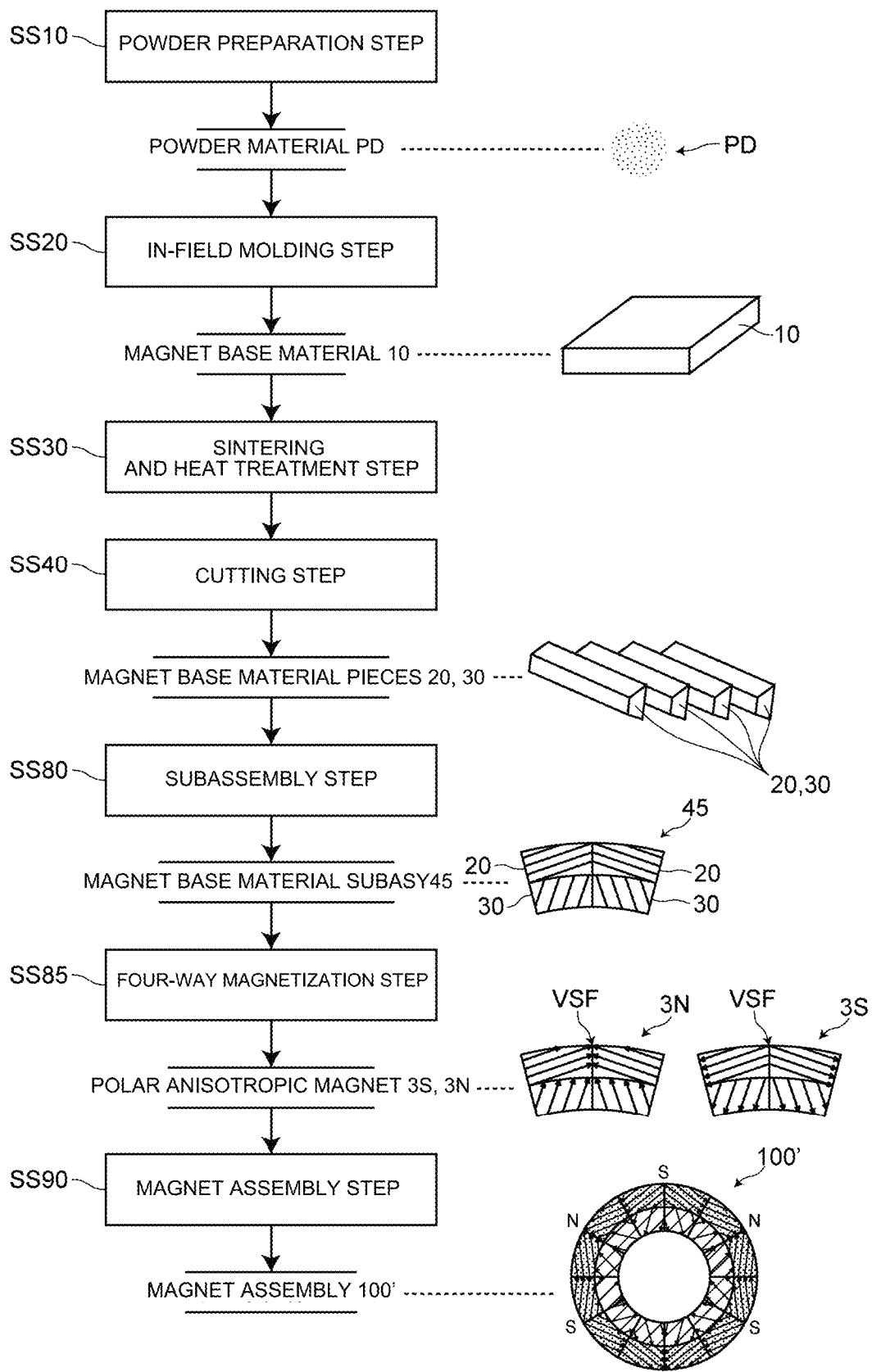
FIG. 25 is a flowchart illustrating a method of manufacturing a magnet assembly according to an embodiment 5 and a flowchart illustrating a method of manufacturing a polar anisotropic magnet.
Figure 26A:
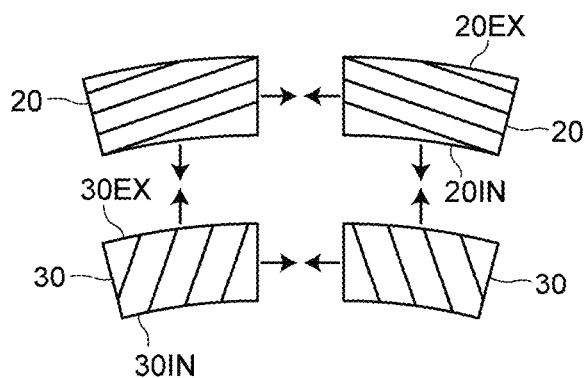
FIGS. 26A and 26B are views illustrating a sub assembly step SS80.
Figure 26B:
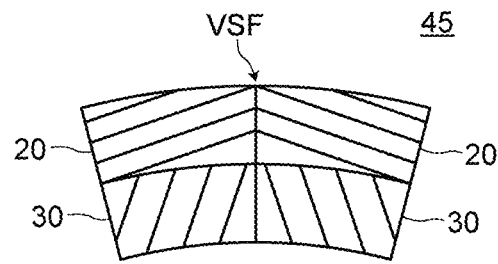
Figure 27:
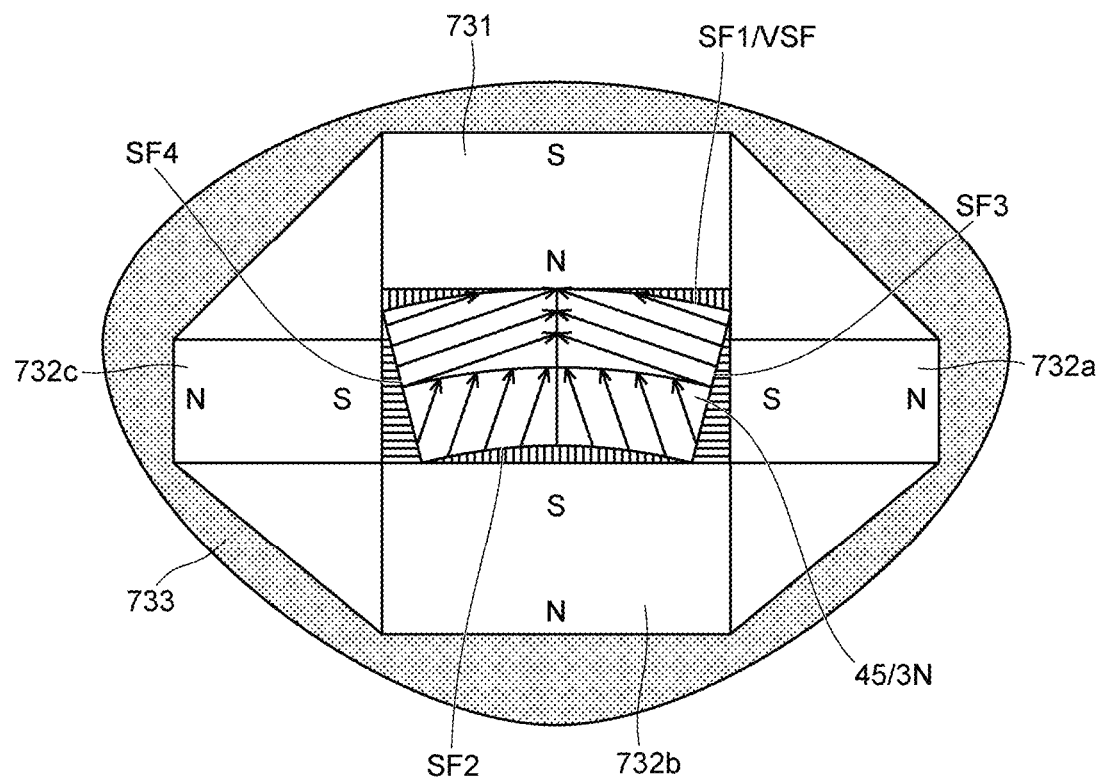
FIG. 27 is a view illustrating a four-way magnetization step SS85.

FIG. 25 is a flowchart for describing a method of manufacturing a magnet assembly and a method of manufacturing a polar anisotropic magnet. FIGS. 26A and 26B are views illustrating a sub assembly step SS80. FIG. 27 is a view illustrating a four-way magnetization step SS85. The members indicated by 45, 3 in FIG. 27 are members in a magnetized state. With respect to basic constitutional elements equal to the constitutional elements in the embodiments 1 to 4 that have the same configurations and technical features, the same symbols used in the embodiments 1 to 4 are added and the description of these constitutional embodiments is omitted from the embodiment 5.

The method of manufacturing a magnet assembly according to the embodiment 5 differs from the method of manufacturing a magnet assembly according to the embodiment 3 with respect to a scope of performance and a manner of performance in the assembly step and the magnetization step performed after the cutting step.

As illustrated in FIG. 25, the method of manufacturing a magnet assembly according to the embodiment 5 includes at least a powder material preparation step SS10, an in-field molding step SS20, a cutting step SS40, the sub assembly step SS80, and the four-way magnetization step SS85 in this order. The method of manufacturing a magnet assembly according to the embodiment 5 further includes a magnet assembly step SS90 after the four-way magnetization step SS85. A surface treatment step SS50 may be performed between the cutting step SS40 and the sub assembly step SS80 or between the sub assembly step SS80 and the four-way magnetization step SS85.

The powder material preparation step SS10, the in-field molding step SS20, and the cutting step SS40 have substantially the same contents as the corresponding steps in the embodiment 3.

The sub assembly step SS80 is a step of assembling a magnet base material sub assembly 45 having four surfaces by combining at least four magnet base material pieces 20, 30. The assembly step SS60 described in the embodiment 3 forms this sub assembly step SS80 in the embodiment 5.

As illustrated in FIGS. 26A and 26B, in the sub assembly step SS80, on a side that becomes an effective surface VSF (a surface on which a magnetic flux is generated in a concentrated manner among four surfaces (as viewed in cross section) that form the magnet base material sub assembly 45), horizontal-system magnet base material pieces 20 where cutting is performed by setting an angle of θ1 and an angle θ2 in the cutting step SS40 respectively within a range from more than 45 degrees to less than 90 degrees are disposed. On a side opposite to the side that becomes the effective surface VSF, vertical-system magnet base material pieces 30 where cutting is performed by setting an angle of θ1 and an angle θ2 in the cutting step SS40 respectively within a range from 0 degrees or more to less than 45 degrees are disposed. Then, the magnet base material sub assembly 45 is obtained by combining, joining and adhering these horizontal-system magnet base material pieces 20 and the vertical-system magnet base material pieces 30 to each other.

As this stage of the operation, the base material pieces 20, 30 are not magnetized and hence, neither an attractive force nor a repulsive force is generated and hence, the combining, the joining, adhesion and the like of the magnet base material pieces 20, 30 can be performed easily.

As described in FIG. 27, in the four-way magnetization step SS85, a magnetic field in a first direction is applied to the effective surface VSF of the magnet base material sub assembly 45, and a magnetic field in a second direction is applied to remaining three surfaces of the magnet base material sub assembly 45 in a state where the magnetic field in the first direction and the magnetic field in the second direction surround the magnet base material sub assembly 45. Accordingly, magnet base material sub assembly 45 is magnetized. In the example illustrated in FIG. 27, the magnetization is performed by applying a positive magnetic field generated from a magnetization-use first magnetic source 731 to the first surface SF1 that forms the effective surface VSF of the magnet base material sub assembly 45 and by applying a negative magnetic field generated by remaining magnetization-use second magnetic sources 732b, 732a and 732c to the remaining second surface SF2, third surface SF3 and fourth surface SF4 thus obtaining a polar anisotropic magnet 3N that generates lines of magnetic force of positive polarity from the effective surface VSF.

By suitably exchanging the polarities of the first direction and the second direction that are magnetic field applying directions, it is possible to suitably obtain a polar anisotropic magnet 3S having a reverse polarity with respect to lines of magnetic force generated from the effective surface VSF of the polar anisotropic magnet.

The detailed description of the four-way magnetization step SS85 is substantially equal to the description of the four-way magnetization step S40 according to the embodiment 1 and hence, the description of the four-way magnetization step S40 is used here and the description of the four-way magnetization step SS85 is omitted here. For the reference sake, the magnetization step described in the embodiment 3 forms this four-way magnetization step SS85 in this embodiment 5.

By performing the above-mentioned steps, the polar anisotropic magnet 3 can be obtained (the method of manufacturing a polar anisotropic magnet according to the embodiment 5 being described heretofore).

The magnet assembly step SS90 is a step of assembling by combining the polar anisotropic magnets 3N, 3S obtained in the four-way magnetization step SS85. For example, joining, the adhesion and the like of the polar anisotropic magnets 3N, 3S that differ in polarities of lines of magnetic force generated from the effective surfaces VSF are performed at their side surfaces. In this case, the magnetic poles of the side surfaces of the polar anisotropic magnets 3N, 3S disposed adjacently to each other have opposite polarities (N pole and S pole) and hence, polar anisotropic magnets 3N, 3S attract each other in performing joining, the adhesion and the like and hence, the assembly can be performed extremely easily. By performing the above-mentioned steps, a magnet assembly 100' having a circular cylindrical shape (circular annular shape) illustrated at a lower portion of FIG. 25 can be obtained (the method of manufacturing a magnet assembly according to the embodiment 5 being described heretofore).

According to the method of manufacturing a magnet assembly according to the embodiment 5 and the method of manufacturing a polar anisotropic magnet according to the embodiment 5, the methods are each formed of the combination of the acquisition of the magnet base material pieces 20, 30 by the parallel magnetic field and the cutting technique according to the embodiments 2 to 4, and the magnetization by the four-way magnetization in the embodiment 1. Accordingly, the method of manufacturing a magnet assembly according to the embodiment 5 can acquire both the advantageous effects of the embodiments 2 to 4 (such as the high degree of freedom in designing because a mold is unnecessary, and the like) brought about by the parallel magnetic field and the cutting technique, and the advantageous effect brought about by four-way magnetization of the embodiment 1 (releasing of the restriction on designing thickness and the mass production of polar anisotropic magnets respectively having a horizontal-system polar anisotropic arrangement and a vertical-system polar anisotropic arrangement).

Application Examples

The magnet assembly 100EX obtained in the embodiment 2, the magnet assembly 100IN obtained in the embodiment 3, and the composite magnet assembly 100 according to the embodiment 4 that is formed using these magnet assemblies are applicable to products in various fields. For example, a motor (see FIG. 12A) that includes a rotor including the composite magnet assembly 100, a generator (see FIG. 12B) that includes a rotor including the composite magnet assembly 100, and an actuator (see FIG. 12C) that includes a rotor including the composite magnet assembly 100 and the like can be formed.

Although it is preferable that the composite magnet assembly 100 be used as a rotor on a rotation side, it is possible to use the composite magnet assembly 100 as a stator on a fixed side. In this case, in this specification, "rotor" is applicable as being exchanged as "stator". Such a configuration also falls within the technical scope of the present invention.

The present invention has been described with reference to the above-mentioned embodiments. However, the present invention is not limited to the above-mentioned embodiments. The invention can be carried out in various modes without departing from the gist of the present invention and, for example, the following modifications are conceivable.

(1) the magnet assemblies 100EX, 100IN that are obtained by carrying out the embodiment 2 and the embodiment 3 are described by estimating the magnet assembly having a cylindrical shape. However, the present invention is not limited to such a magnet assembly. The present invention is applicable to a straight-line-shaped magnet assembly (not illustrated in the drawings).

For example, in the embodiments 2 and 3, the magnet assembly may be also formed of a linear-type magnet assembly where a length of the cutting line 20EX' of the scheduled outer diameter surface and a length of the cutting line 20IN' of the scheduled inner diameter surface are equal to each other, and among surfaces that form the magnet blocks, the surfaces that form the effective H magnetic flux surface of the composite magnet assembly become substantially coplanar between the magnet blocks disposed adjacently to each other.

In this case, the configuration differs from the embodiments 2, 3 and 4 only with respect to a point that the composite magnet assembly is not formed into a cylindrical shape. However, other configurations are performed in the same manner. By combining the linear-type magnet assembly of the first mode and the linear-type magnet assembly of the second mode to each other, it is possible to obtain a linear-type composite magnet assembly 130 illustrated in FIG. 29A, for example.

Figure 28:
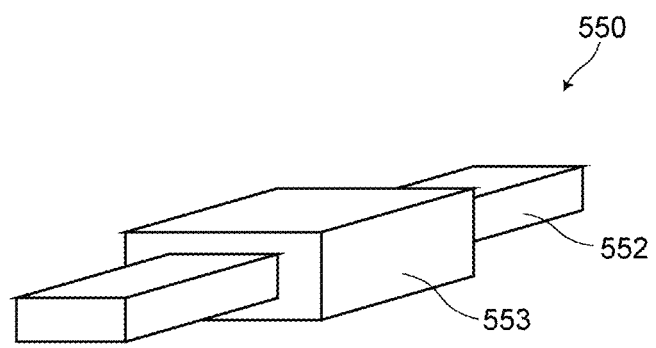
FIG. 28 is a schematic view illustrating a linear motor structural body 550 according to a modification of an application example.
Figure 29A:
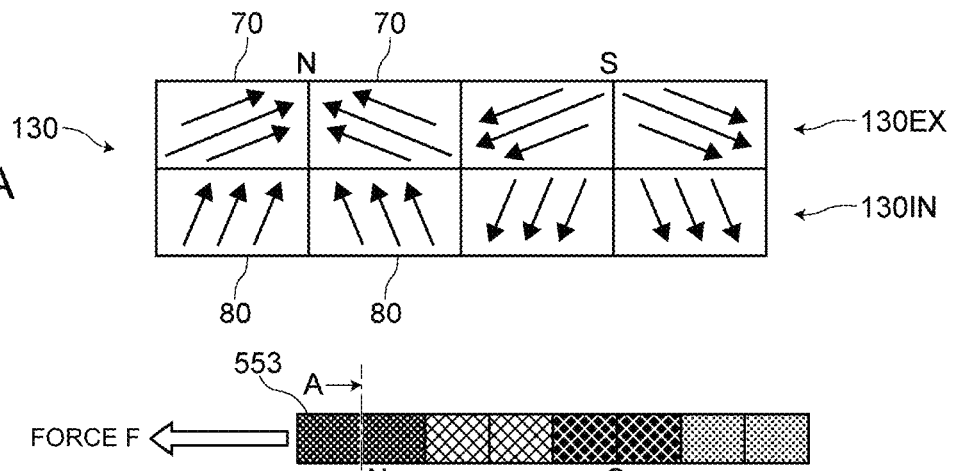
FIGS. 29A to 29C are views illustrating the detail of the linear motor structural body 550.
Figure 29B:
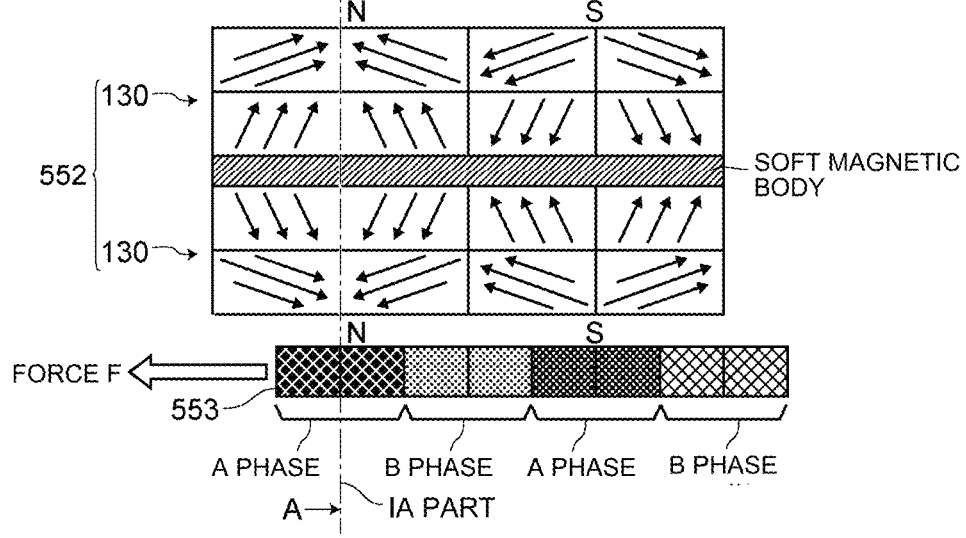
Figure 29C:
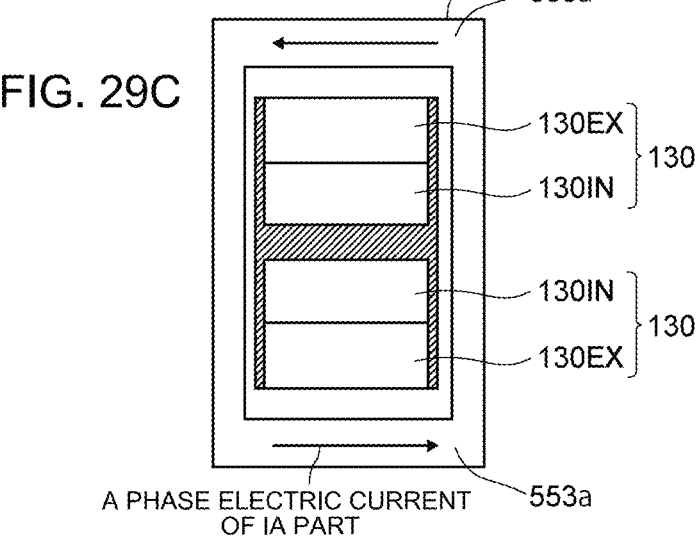

(2) By using the linear-type composite magnet assembly 130, it is possible to form a linear motor structural body 550 that includes the linear-type composite magnet assembly 130 (see FIG. 28, FIG. 29B and FIG. 29C). In this case, the rotor (rotator) in this specification may be applied by exchanging the rotor (rotator) as a mover (moving element).

FIG. 28 is a schematic view illustrating the linear motor structural body 550 according to the modification of the application example. FIGS. 29A to 29C are views illustrating the detail of the linear motor structural body 550. FIG. 29B is a cross-sectional view of the linear motor structural body 550 illustrated in FIG. 28 taken along a plane parallel to a longitudinal direction axis, and FIG. 29C is a cross-sectional view of the linear motor structural body 550 illustrated in FIG. 28 taken along a line A-A in FIG. 29B. In the drawings, symbol 552 indicates a rail, symbol 553 indicates a moving body, symbol 553a indicates a coil portion of the moving body, symbol 70, 80 indicate magnet blocks, symbol 130EX indicates a magnet assembly on an outer diameter side, and symbol 130IN indicates a composite magnet assembly on an inner diameter side respectively.

The invention claimed is:

1. A method of manufacturing a polar anisotropic magnet having four surfaces that respectively face four directions as viewed in cross section: the method of manufacturing a polar anisotropic magnet comprising, in a following order:
    a powder material preparation step in which a powder material for a magnet is prepared;
    an in-field molding step in which the powder material is sequentially charged into the mold in a state where, assuming a surface on which a magnetic flux is to be generated in a concentrated manner out of the four surfaces as an effective surface, a magnetic field of a first direction is applied to an assumed effective surface expected to become the effective surface and a magnetic field of a second direction is applied to the remaining three surfaces from an outside of the mold that corresponds to a target shape of the polar anisotropic magnet thus molding a magnet base material having a shape that traces the mold; and
    a four-way magnetization step in which a magnet material obtained based on the magnet base material is magnetized by applying the magnetic field of the first direction to the effective surface of the magnet material and by applying the magnetic field of the second direction to the remaining three surfaces in a state where the magnetic field of the first direction and the magnetic field of the second direction surround the magnet material.

2. The method of manufacturing a polar anisotropic magnet according to claim 1, wherein
    in the in-field molding step, a first magnetic source is disposed such that a first magnetic pole faces the assumed effective surface, a second magnetic source is disposed such that a second magnetic pole faces the remaining three surfaces respectively other than the assumed effective surface among the four surfaces, the magnetic field of the first direction is applied to the assumed effective surface by the first magnetic source and the magnetic field of the second direction is applied to the remaining three surfaces respectively by the second magnetic source, and
    in the four-way magnetization step, a magnetization-use first magnetic source is disposed such that the first magnetic pole faces the effective surface and a magnetization-use second magnetic source is disposed such that the second magnetic pole faces the remaining three surfaces respectively, the magnetic field of the first direction is applied to the effective surface by the magnetization-use first magnetic source and the magnetic field of the second direction is applied to the remaining three surfaces respectively by the magnetization-use second magnetic source.

3. The method of manufacturing a polar anisotropic magnet according to claim 1, further comprising a sintering and heat treatment step for applying sintering and heat treatment to the magnet base material obtained by the in-field molding step between the in-field molding step and the four-way magnetization step.

4. The method of manufacturing a polar anisotropic magnet according to claim 1, wherein a target shape of the polar anisotropic magnet has a split ring shape formed by equally dividing a circular ring by N, N being a natural number of 2 or more, as viewed in cross section.

5. The method of manufacturing a polar anisotropic magnet according to claim 1, wherein
    in the in-field molding step, a width of a side where the first magnetic pole of the first magnetic source is disposed is set smaller than a width of the assumed effective surface expected to become the effective surface, and/or
    in the four-way magnetization step, a width of a side where the first magnetic pole of the magnetization-use first magnetic source is set smaller than a width of the effective surface.

6. A polar anisotropic magnet having four surfaces that respectively face four directions as viewed in cross section, wherein
    assuming the surface on which a magnetic flux is to be generated in a concentrated manner as an effective surface among the four surfaces, one magnetic pole is disposed on the effective surface, and the other magnetic pole is disposed on the remaining three surfaces among the four surfaces respectively, and
    as viewed in cross section, no adhesion trace is formed in the inside of the polar anisotropic magnet so that the polar anisotropic magnet is formed continuously in the inside of the polar anisotropic magnet.

7. The polar anisotropic magnet according to claim 6, wherein as viewed in cross section, the polar anisotropic magnet has a split ring shape formed by dividing a circular ring by N, N being a natural number of 2 or more.

8. A magnet assembly formed of a plurality of the polar anisotropic magnets described in claim 6, wherein
    the polar anisotropic magnets are arranged such that the one magnetic pole and the other magnetic pole alternately appear and the polar anisotropic magnets are joined to each other.

9. The magnet assembly according to claim 8, wherein
    the polar anisotropic magnets are arranged along a circumferential direction so that the magnet assembly has an approximately circular cylindrical shape.

10. A motor comprising a rotor that includes the magnet assembly according to claim 9.

11. A generator comprising a rotor that includes the magnet assembly according to claim 9.

12. An actuator comprising a rotor that includes the magnet assembly according to claim 9.

13. A method of manufacturing a magnet assembly having a cylindrical shape, the method of manufacturing a magnet assembly comprising, in a following order:
    a powder material preparation step where a powder material for a magnet is prepared;
    an in-field molding step where a "magnet base material" having a first main surface and a second main surface disposed on a side opposite to the first main surface is molded, wherein the powder material is charged into the inside of a mold that corresponds to a shape of the magnet base material, and a magnetic field having lines of magnetic force in a single direction and in parallel is applied to an outer side of the mold from a side that corresponds to the first main surface to a side that corresponds to the second main surface, thus molding the magnet base material;
    a cutting step where, a surface that forms an outer diameter surface of the magnet assembly when assembled as the magnet assembly is defined as a "scheduled outer diameter surface" and a surface that forms an inner diameter surface when assembled as the magnet assembly is defined a "scheduled inner diameter surface", a cutting line of the scheduled outer diameter surface is set to have inclination of an angle θ1 with respect to the first main surface, the magnet base material is cut along the cutting line of the scheduled outer diameter surface, a cutting line of the scheduled inner diameter surface is set to have inclination of an angle θ2 with respect to the first main surface, the magnet base material is cut along the cutting line of the scheduled inner diameter surface, thus cutting out a magnet base material piece having at least the scheduled outer diameter surface and the scheduled inner diameter surface on an outer surface;

an assembly step where a plurality of the magnet base material pieces are combined with each other so as to assemble a magnet base material assembly; and a magnetization step where a predetermined magnetic field is applied to the magnet base material assembly from an outside of the magnet base material assembly at a predetermined position, thus magnetizing the magnet base material assembly.

14. The method of manufacturing a magnet assembly according to claim 13, wherein
the magnet base material is cut such that the scheduled outer diameter surface and/or the scheduled inner diameter surface cut out in the cutting step are each formed of a flat surface.

15. The method of manufacturing a magnet assembly according to claim 13, wherein
the cutting step is performed by a wire cutting method.

16. The method of manufacturing a magnet assembly according to claim 13, wherein
the angle θ1 and the angle θ2 in the cutting step are each set to a value that falls within a range from more than 45 degrees to less than 90 degrees.

17. The method of manufacturing a magnet assembly according to claim 13, wherein
the angle θ1 and the angle θ2 in the cutting step are each set to a value that falls within a range from 0 degrees or more to less than 45 degrees.

18. The method of manufacturing a magnet assembly according to claim 13, wherein
assuming directions of respective powders of the powder material that are aligned by performing the in-field molding step as an "axis of easy magnetization",
in the cutting step, a cutting line of the scheduled outer diameter surface and a cutting line of the scheduled inner diameter surface are set to values that fall within a range from more than 0 degrees and less than 45 degrees respectively with respect to the axis of easy magnetization, and the magnet base material is cut along the cutting line of the scheduled outer diameter surface and the cutting line of the scheduled inner diameter surface.

19. The method of manufacturing a magnet assembly according to claim 13, wherein
assuming directions of respective powders of the powder material that are aligned by performing the in-field molding step as an "axis of easy magnetization",
in the cutting step, a cutting line of the scheduled outer diameter surface and a cutting line of the scheduled inner diameter surface are set to values that fall within a range from more than 45 degrees to less than 90 degrees respectively with respect to the axis of easy magnetization, and the magnet base material is cut along the cutting line of the scheduled outer diameter surface and the cutting line of the scheduled inner diameter surface.

20. The method of manufacturing a magnet assembly according to claim 13, wherein
the assembly step is a sub assembly step where a magnet base material sub assembly having four surfaces is assembled by combining at least the four magnet base material pieces, and
in the sub assembly step, assuming the surface on which a magnetic flux is to be generated in a concentrated manner among the four surfaces as an effective surface, on a side of the magnet base material sub assembly that forms the effective surface, the magnet base material piece of a horizontal system is disposed in a state where cutting is performed such that the angle θ1 and the angle θ2 in the cutting step are each set to a value that falls within a range from more than 45 degrees to less than 90 degrees, and on a side of the magnet base material opposite to the side on which the effective surface is formed, the magnet base material piece of a vertical system is disposed in a state where cutting is performed such that the angle θ1 and the angle θ2 in the cutting step are each set to a value that falls within a range from 0 degrees or more to less than 45 degrees, and
the magnetization step is a four-way magnetization step where a magnetic field in a first direction is applied to the effective surface of the magnet base material sub assembly, and a magnetic field in a second direction is applied to the remaining three surfaces such that the magnetic fields surround the magnet base material sub assembly thus magnetizing the magnet base material sub assembly.

21. A method of manufacturing a polar anisotropic magnet having four surfaces as viewed in cross section: the method of manufacturing a polar anisotropic magnet comprising, in a following order:
a powder material preparation step in which a powder material for a magnet is prepared;
an in-field molding step in which a "magnet base material" having a first main surface and a second main surface on a side opposite to the first main surface is molded in such a manner that the powder material is charged into the inside of the mold that corresponds to a shape of the magnet base material, and a magnetic field having lines of magnetic force in a single direction and in parallel is applied to an outer side of the mold from a side that corresponds to the first main surface to a side that corresponds to the second main surface, thus molding the magnet base material;
a cutting step in which, when the polar anisotropic magnet is assembled as a magnet assembly, a surface of the polar anisotropic magnet that is scheduled to form an outer diameter surface of the magnet assembly is defined as a "scheduled outer diameter surface" and a surface of the polar anisotropic magnet that is scheduled to form an inner diameter surface of the magnet assembly is defined as a "scheduled inner diameter surface", a cutting line of the scheduled outer diameter surface is set so as to have an inclination of an angle θ1 with respect to the first main surface and the magnet base material is cut along the cutting line of the scheduled outer diameter surface, a cutting line of the scheduled inner diameter surface is set so as to have an inclination of an angle θ2 with respect to the first main surface and the magnet base material is cut along the cutting line of the scheduled inner diameter surface, thus cutting out a magnet base material piece having at least the scheduled outer diameter surface and the scheduled inner diameter surface on an outer surface;

a sub assembly step in which a magnet base material sub assembly having four surfaces is assembled by combining at least four magnet base material pieces in such a manner that, wherein, in the sub assembly step, assuming the surface on which a magnetic flux is to be generated in a concentrated manner among the four surfaces as an effective surface, on a side of the magnet base material sub assembly that forms the effective surface, the magnet base material piece of a horizontal system is disposed in a state where cutting is performed such that the angle $\theta 1$ and the angle $\theta 2$ in the cutting step are each set to a value that falls within a range from more than 45 degrees to less than 90 degrees, and on a side of the magnet base material sub assembly opposite to the side on which the effective surface is formed, the magnet base material piece of a vertical system is disposed in a state where cutting is performed such that the angle $\theta 1$ and the angle $\theta 2$ in the cutting step are each set to a value that falls within a range from 0 degrees or more to less than 45 degrees, thus assembling the magnet base material sub assembly; and a four-way magnetization step where a magnetic field in a first direction is applied to the effective surface of the magnet base material sub assembly, and a magnetic field in a second direction is applied to the remaining three surfaces in a state where the magnetic field in the first direction and the magnetic field in the second direction surround the magnet base material sub assembly, thus magnetizing the magnet base material sub assembly.

22. A magnet assembly comprising a magnet block having an outer diameter surface and an inner diameter surface each formed of an approximately flat surface, the magnet block having lines of magnetic forces in a single direction and in parallel at a predetermined angle with respect to the outer diameter surface and the inner diameter surface, wherein a plurality of the magnet blocks are joined to each other by way of a surface other than the outer diameter surface and the inner diameter surface.

23. A composite magnet assembly comprising:

the magnet assembly of the first mode according to claim 22 where the angle of the magnetization direction with respect to the outer diameter surface and the inner diameter surface of the each magnetic block is set to a first angle; and the magnet assembly of the second mode according to claim 22 where the angle of the magnetization direction with respect to the outer diameter surface and the inner diameter surface of the each magnetic block is set to a second angle, wherein the magnet assembly of the first mode is disposed on a side that is to be formed as the effective H magnetic flux surface of the composite magnet assembly, and the magnet assembly of the second mode is disposed on a side that is to be formed as the effective V magnetic flux surface of the composite magnet assembly, and the magnet assembly of the first mode and the magnet assembly of the second mode are joined to each other.

24. The composite magnet assembly according to claim 23, wherein N pieces of the magnet blocks are joined to each other in a state where an outer peripheral side and an inner peripheral side are formed into an N-sided polygonal cylindrical shape, and assuming nps (the number of same poles) is 2 (nps=2), npNs (the number of different poles) is 2 (npNs=2), and ns is the number of sets (the number of sets being the natural number of 1 or more), N is a natural number that satisfies a relationship of N=nps×npNs×ns.

25. A motor comprising a rotor that includes the composite magnet assembly according to claim 24.

26. A generator comprising a rotor that includes the composite magnet assembly according to claim 24.

27. An actuator comprising a rotor that includes the composite magnet assembly according to claim 24.

28. A linear-type composite magnet assembly that is the composite magnet assembly according to claim 23, and among the surfaces that form the magnet blocks, the surfaces that are to be formed as the effective H magnetic flux surfaces of the composite magnet assemblies are formed so as to form a coplanar surface between the magnet blocks that are disposed adjacently to each other.

29. A linear motor structural body comprising the composite magnet assembly according to claim 28.

* * * * *